(12) United States Patent
Liu et al.

(10) Patent No.: US 11,395,182 B2
(45) Date of Patent: Jul. 19, 2022

(54) USER EQUIPMENT, BASE STATION, AND RELATED METHOD

(71) Applicants: Sharp Kabushiki Kaisha, Sakai (JP); FG Innovation Company Limited, Tuen Mun (HK)

(72) Inventors: Renmao Liu, Shanghai (CN); Chao Luo, Shanghai (CN); Ningjuan Chang, Shanghai (CN); Chongming Zhang, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 86 days.

(21) Appl. No.: 16/961,734

(22) PCT Filed: Dec. 27, 2018

(86) PCT No.: PCT/CN2018/124353
§ 371 (c)(1),
(2) Date: Jul. 13, 2020

(87) PCT Pub. No.: WO2019/141061
PCT Pub. Date: Jul. 25, 2019

(65) Prior Publication Data
US 2021/0058823 A1 Feb. 25, 2021

(30) Foreign Application Priority Data

Jan. 19, 2018 (CN) .......................... 201810057863.0

(51) Int. Cl.
*H04W 28/06* (2009.01)
*H04L 5/00* (2006.01)
(Continued)

(52) U.S. Cl.
CPC ........... *H04W 28/06* (2013.01); *H04L 5/0048* (2013.01); *H04L 5/0053* (2013.01); *H04W 72/0413* (2013.01); *H04W 74/0833* (2013.01)

(58) Field of Classification Search
CPC ............. H04W 28/06; H04W 72/0413; H04W 74/0833; H04L 5/0048; H04L 5/0053
(Continued)

(56) References Cited

U.S. PATENT DOCUMENTS

2008/0056182 A1* 3/2008 Usuda ................... H04L 1/1825
370/329
2020/0383134 A1* 12/2020 Tirronen ........... H04W 74/0833

OTHER PUBLICATIONS

Ericsson, "Early data transmission for MTC", 3GPP TSG-RAN WG1 Meeting #91, R1-1719350, Nov. 27-Dec. 1, 2017, pp. 1-5.
(Continued)

*Primary Examiner* — Chi Tang P Cheng
(74) *Attorney, Agent, or Firm* — ScienBiziP, P.C.

(57) ABSTRACT

Embodiments of the present invention provide a method for performing early data transmission in a random access process, and a corresponding base station and corresponding user equipment. The method comprises: receiving a random access response message and a broadcast message, the random access response message comprising an uplink grant for user equipment to perform the early data transmission, wherein the uplink grant comprises information indicating resource allocation and information indicating a repetition number; determining, according to the uplink grant and/or the broadcast message, a maximum transmission block size allowed during the early data transmission and a resource and a repetition number corresponding thereto; obtaining, according to the allowed maximum transmission block size, candidate values of available transmission block sizes and a resource and a repetition number corresponding to each candidate value; and selecting, according to the size of
(Continued)

uplink data to be transmitted, a candidate value of a suitable transmission block size and a resource and a repetition number corresponding thereto to perform the early data transmission in a random access message 3. The method according to the embodiments of the present invention can reduce the power consumption of UE.

4 Claims, 7 Drawing Sheets

(51) Int. Cl.
*H04W 72/04* (2009.01)
*H04W 74/08* (2009.01)

(58) Field of Classification Search
USPC .......................................................... 370/329
See application file for complete search history.

(56) References Cited

OTHER PUBLICATIONS

Samsung, "Early data transmission for eMTC", 3GPP TSG-RAN WG1 Meeting #91, R1-1720260, Nov. 27-Dec. 1, 2017, pp. 1-5.
MediaTek Inc., "On NB-IoT EDT Indication via PRACH", #3GPP TSG RAN WG1 Meeting #91, R1-1719592, Nov. 27-Dec. 1, 2017, pp. 1-5.
Ericsson, "Remaining general aspects of early data transmission", 3GPP TSG-RAN WG2 Meeting #100, R2-1713054, Nov. 27-Dec. 1, 2017, 7 pages.
Official Communication issued in International Patent Application No. PCT/CN2018/124353, dated Feb. 27, 2019.
MediaTek Inc., "Remaining Issues on UCI Transmission", 3GPP TSG RAN WG1 Meeting #84bis, R1-163261, Apr. 11-15, 2016, pp. 1-4.
Ericsson, "[99bis#53][MTC/NB-IoT] EDT indication via PRACH", 3GPP TSG-RAN WG2 #100, R2-1713057, Nov. 27-Dec. 1, 2017, pp. 1-30.
Huawei et al., "New WID on Further NB-IoT enhancements", #3GPP TSG RAN Meeting #75, RP-170852, Mar. 6-9, 2017, 6 pages.
Ericsson et al., "New WID on Even further enhanced MTC for LTE", 3GPP TSG RAN Meeting #75, RP-170732, Mar. 6-9, 2017, 4 pages.
ZTE, Sanechips, "On early data transmission for eMTC", 3GPP TSG RAN WG1 Meeting #91, Reno, USA. R1-1719722. Dec. 1, 2017. Whole document.
"LTE; Evolved Universal Terrestrial Radio Access (E-UTRA); Physical layer procedures", ETSI TS 136 213 V13.7.0 (Oct. 2017). Whole ducument.
MediaTek Inc., "On NB-IoT EDT indication via PRACH", 3GPP TSG RAN WG2 Meeting #100, Reno, Nevado, USA. R2-1713679. Dec. 1, 2017. Whole ducument.

* cited by examiner

USER EQUIPMENT, BASE STATION, AND RELATED METHOD

TECHNICAL FIELD

The present disclosure relates to the field of wireless communications technologies. More specifically, the present disclosure relates to user equipment, a base station, and related methods.

BACKGROUND

A new work item on further enhancement of machine type communication (MTC) (see non-patent literature 1: RP-170732: New WID on Even further enhanced MTC for LTE) and a new work item on further enhancement of NarrowBand-Internet of Things (NB-IoT) (see non-patent literature 2: RP-170852: New WID on Further NB-IoT enhancements) were approved at the 3rd Generation Partnership Project (3GPP) RAN #75 plenary meeting held in March 2017. It was mentioned in both of the two research projects that early data transmission (EDT) needs to be supported in 5GPP Rel-15. The early data transmission refers to the transmission of downlink and/or uplink data on a dedicated resource in a random access process, namely, after a physical random access channel (PRACH) is transmitted and before a radio resource control (RRC) connection is setup.

In the 3GPP RAN2 #100 meeting held in Reno, USA in November 2017, the following working hypothesis was reached: indication of the size of uplink data to be transmitted by a user through partitioning of PRACH resources is not supported except an existing maximum transmission block size (TBS) or a maximum TBS broadcast based on a coverage enhancement level. That is, a base station or an evolved base station (Evolved Node B: eNB) does not know the size of the uplink data to be transmitted by the user. However, the base station can estimate the condition or quality of an uplink channel of the user by receiving a PRACH. In this case, a problem that needs to be solved is how the base station schedules a physical uplink shared channel (PUSCH) carrying a random access message 3 (Msg3) through an uplink grant (UL Grant) in a media access control (MAC) random access response (RAR).

If the base station schedules transmission of the Msg3 according to the maximum transmission block size, when the data to be transmitted by the UE is less than the maximum transmission block size, the UE still transmits the Msg3 according to the maximum transmission block size after data padding. This will cause transmitting power loss of the UE.

SUMMARY

In order to solve or at least alleviate at least some of the aforementioned problems, embodiments of the present invention provide a mechanism capable of scheduling data transmission in a random access message 3 (Msg3) through an uplink grant in a random access response in combination with a system broadcast. Specifically, an embodiment of the present invention provides a method for performing early data transmission, and user equipment and a base station for performing the method.

According to a first aspect of the present invention, a method for performing early data transmission is provided, the method comprising: receiving a random access response message and a broadcast message, the random access response message comprising an uplink grant for user equipment to perform the early data transmission, wherein the uplink grant comprises information indicating resource allocation and information indicating a repetition number; determining, according to the uplink grant and/or the broadcast message, a maximum transmission block size allowed during the early data transmission and a resource and a repetition number corresponding thereto; obtaining, according to the allowed maximum transmission block size, candidate values of available transmission block sizes and a resource and a repetition number corresponding to each candidate value; and selecting, according to the size of uplink data to be transmitted, a candidate value of a suitable transmission block size and a resource and a repetition number corresponding thereto to perform the early data transmission in a random access message 3.

In some embodiments, the determining the allowed maximum transmission block size may comprise: using a maximum transmission block size broadcast by a base station and corresponding to a coverage enhancement level of the user equipment to serve as the maximum transmission block size allowed when the early data transmission is performed. Alternatively, in some other embodiments, the uplink grant may further comprise index information indicating the allowed maximum transmission block size, and the determining the allowed maximum transmission block size may comprise: determining, according to the index information, the maximum transmission block size allowed when the early data transmission is performed from a group of transmission block sizes pre-associated with a maximum transmission block size broadcast by a base station and corresponding to a coverage enhancement level of the user equipment.

In some embodiments, each allowed maximum transmission block size and candidate values of a group of available transmission block sizes associated therewith have a predetermined mapping relationship. Alternatively, in some other embodiments, each allowed maximum transmission block size is pre-associated with the candidate values of a group of available transmission block sizes.

In some embodiments, the information indicating resource allocation comprised in the uplink grant may comprise: information indicating resource allocation corresponding to a time when the allowed maximum transmission block size is used on a coverage enhancement level of the user equipment.

In some embodiments, the information indicating a repetition number comprised in the uplink grant may comprise: information indicating a unified repetition number corresponding to a coverage enhancement level of the user equipment. Alternatively, in some other embodiments, the information indicating a repetition number comprised in the uplink grant may comprise: information indicating a repetition number corresponding to a time when the allowed maximum transmission block size is used on a coverage enhancement level of the user equipment.

According to a second aspect of the present invention, a method for performing early data transmission is provided, the method comprising: transmitting a random access response message and a broadcast message, the random access response message comprising an uplink grant for user equipment to perform the early data transmission, wherein the uplink grant comprises information indicating resource allocation and information indicating a repetition number; determining, according to the uplink grant and/or the broadcast message, a maximum transmission block size allowed during the early data transmission and a resource and a repetition number corresponding thereto; obtaining, according to the allowed maximum transmission block size, candidate values of available transmission block sizes and a resource and a repetition number corresponding to each candidate value; and performing blind demodulation detection, based on the candidate values of the available transmission block sizes and the resource and the repetition number corresponding to each candidate value, on the early data transmission performed by the user equipment in a random access message 3.

According to a third aspect of the present invention, user equipment is provided, comprising: a processor; and a memory, the memory storing machine-readable instructions, wherein when executed by the processor, the instructions cause the processor to perform the method according to the first aspect of the present invention.

According to a fourth aspect of the present invention, a base station is provided, comprising: a processor; and a memory, the memory storing machine-readable instructions, wherein when executed by the processor, the instructions cause the processor to perform the method according to the second aspect of the present invention.

BRIEF DESCRIPTION OF THE DRAWINGS

The above and other features of the present disclosure will become more apparent with the following detailed description in conjunction with the accompanying drawings.

In the drawings, identical or similar structures are marked by identical or similar reference numerals.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

As described earlier, a new work item on further enhancement of machine type communication (MTC) (see non-patent literature 1: RP-170732: New WID on Even further enhanced MTC for LTE) and a new work item on further enhancement of NarrowBand-Internet of Things (NB-IoT) (see non-patent literature 2: RP-170852: New WID on Further NB-IoT enhancements) were approved at the 3rd Generation Partnership Project (3GPP) RAN #75 plenary meeting held in March 2017. It was mentioned in both of the two research projects that early data transmission (EDT) needs to be supported in 5GPP Rel-15. The early data transmission refers to the transmission of downlink and/or uplink data on a dedicated resource in a random access process, namely, after a physical random access channel (PRACH) is transmitted and before a radio resource control (RRC) connection is setup.

Figure 1:
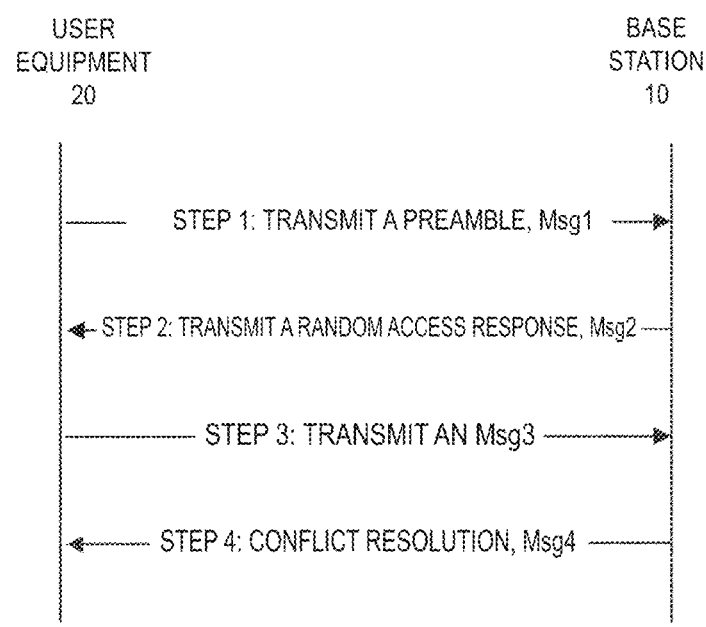
FIG. 1 schematically shows a schematic diagram of a contention-based random access procedure.

Random access is a basic and important process in a 3GPP LTE system and usually exists in two manners: contention-based random access and non-contention based random access. FIG. 1 schematically shows a schematic diagram of a contention-based random access procedure. As shown in FIG. 1, contention-based random access includes the following four steps:

Step 1: User Equipment (UE) randomly selects and transmits a preamble, namely, a random access message 1 (Msg1), on a random access channel.

Step 2: after detecting the preamble, a base station transmits a random access response (RAR), namely, a random access message 2 (Msg2), in a downlink direction. The random access response includes at least the following information:

a number of the received preamble;
timing adjustment information;
uplink grant (UL Grant) information allocated to the UE;
temporarily allocated cell-radio network temporary identity (C-RNTI).

Step 3: after receiving the random access response, the UE transmits an uplink message, namely, a random access message 3 (Msg3), on an allocated uplink resource according to an indication of the random access response.

Step 4: the base station receives the uplink message of the UE and returns a conflict resolution message, namely, a random access message 4 (Msg4), to the UE that has made successful access.

The early data transmission (EDT) refers to data transmission in the Msg3 (uplink direction) and/or Msg4 (downlink direction). Early data transmission in the Msg3, namely, uplink early data transmission, is mainly discussed herein.

In the 3GPP RAN2 #99 bis meeting held in Prague, Czech Republic in October 2017, RAN2 reached the following consensus: a base station may be informed through partitioning of PRACH resources that UE wants to perform the early data transmission in an Msg3; and a maximum possible transmission block size may be broadcast to the Msg3 based on each coverage enhancement level.

In the 3GPP RAN2 #100 meeting held in Reno, USA in November 2017, the following working hypothesis was reached: indication of the size of uplink data to be transmitted by a user through partitioning of PRACH resources is not supported except an existing maximum transmission block size (TBS) or a maximum TBS broadcast based on a coverage enhancement level.

It is known from the consensus reached by RAN2 that the base station can know a coverage enhancement level of the UE by receiving an Msg1 and accordingly know a maximum transmission block size to be transmitted by the UE in the Msg3. The base station may schedule transmission of the Msg3 according to the maximum transmission block size. When the data to be transmitted by the UE is less than the maximum transmission block size, the UE still transmits the Msg3 according to the maximum transmission block size after data padding. This will cause transmitting power loss of the UE.

One feasible solution is to provide a plurality of transmission block sizes for the Msg3 through an Msg2, so that the UE selects a suitable transmission block size according to the size of uplink data to be transmitted or a transmission block size to perform the early data transmission in the Msg3. The base station obtains a transmission block size used by the UE to transmit the Msg3 via blind detection of a plurality of transmission block sizes possibly used by the UE. Specifically, the following two solutions may exist:

Solution 1: for different transmission block sizes possibly used, perform the early data transmission in the Msg3 using the same repetition number but different resource sizes; and Solution 2: for different transmission block sizes possibly used, perform the early data transmission in the Msg3 using the same resource size but different repetition numbers.

The solutions of the present invention are described in detail below with reference to the accompanying drawings.

Figure 2:
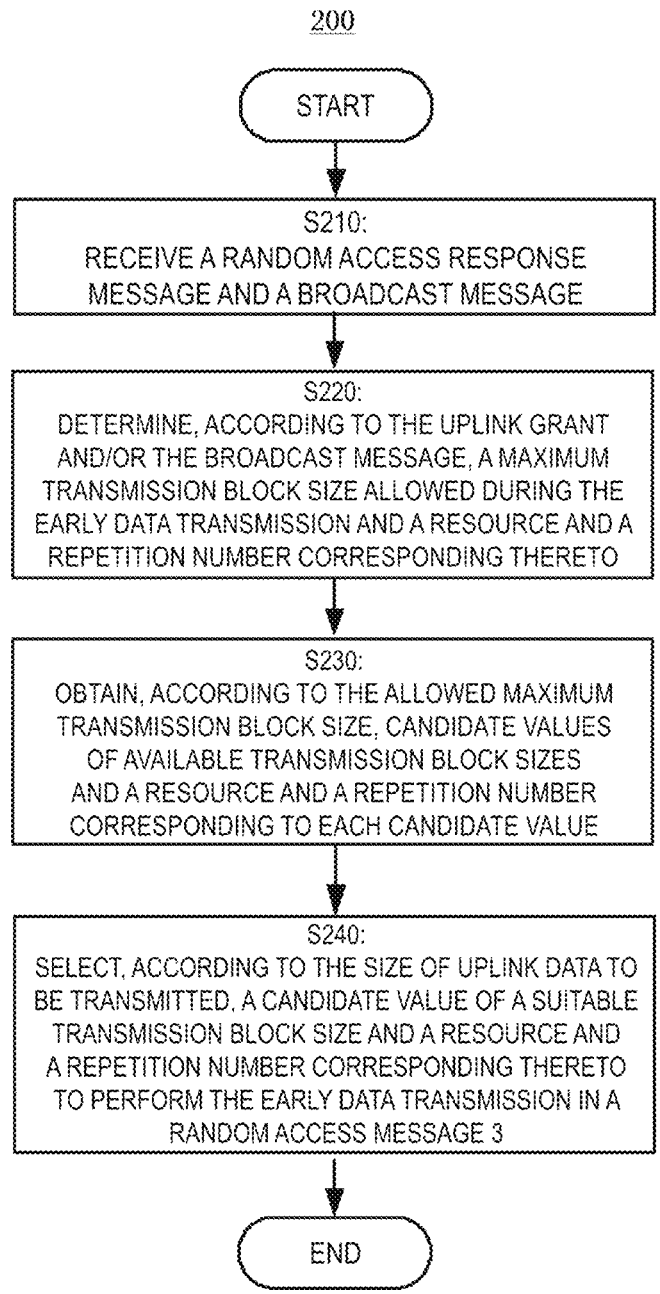
FIG. 2 schematically shows an exemplary flowchart illustrating an operation of a method for performing early data transmission according to an embodiment of the present invention on a user equipment side.

FIG. 2 schematically shows an exemplary flowchart illustrating an operation 200 of a method for performing early data transmission according to an embodiment of the present invention on a UE side.

As shown in the figure, Step S210: receive a random access response message and a broadcast message. The random access response message includes an uplink grant for user equipment to perform the early data transmission, where the uplink grant includes information indicating resource allocation and information indicating a repetition number.

In some embodiments, the uplink grant does not need to include information indicating a transmission block size.

In some other embodiments, the uplink grant may include information indicating a transmission block size, for example, may include index information of a maximum transmission block size.

Step S220: determine, according to the uplink grant and/or the broadcast message, a maximum transmission block size allowed during the early data transmission and a resource and a repetition number corresponding thereto.

In some embodiments where the uplink grant does not include information indicating a transmission block size, in step S220, the maximum transmission block size allowed during the early data transmission may be determined according to the broadcast message. Specifically, a maximum transmission block size broadcast by a base station and corresponding to a coverage enhancement level of the user equipment may be used as the maximum transmission block size allowed when early data transmission is performed.

In some embodiments where the uplink grant includes information indicating a transmission block size, in step S220, the maximum transmission block size allowed during the early data transmission may be determined according to the uplink grant and the broadcast message. For example, in an embodiment where a group of transmission block sizes is predefined for a possibly broadcast maximum transmission block size in a system and the uplink grant includes index (for example, an index of the maximum transmission block size in the associated group) information, the maximum transmission block size allowed when early data transmission is performed may be determined according to the index information from a group of transmission block sizes pre-associated with a maximum transmission block size broadcast by the base station and corresponding to a coverage enhancement level of the user equipment. As another example, in an embodiment where a plurality of groups of available transmission block sizes are predefined for a possibly broadcast maximum transmission block size in the system and the uplink grant includes index (for example, an index of an associated group that the maximum transmission block size is in) information, the group of transmission block sizes available when early data transmission is performed (namely, the associated group that the maximum transmission block size is in) may be determined according to the index information from a plurality of groups of transmission block sizes pre-associated with a maximum transmission block size broadcast by the base station and corresponding to a coverage enhancement level of the user equipment.

In some embodiments, the information indicating resource allocation included in the uplink grant may include information indicating resource allocation corresponding to a time when the allowed maximum transmission block size is used on a coverage enhancement level of the user equipment. Then, once the maximum transmission block size allowed during the early data transmission is determined, a resource corresponding to the maximum transmission block size can be determined according to the information indicating resource allocation in the uplink grant.

In some embodiments, for different transmission block sizes possibly used, early data transmission is performed in the Msg3 using the same repetition number but different resource sizes (for example, the aforementioned solution 1). In these embodiments, the information indicating a repetition number included in the uplink grant may be information indicating a unified repetition number corresponding to a coverage enhancement level of the user equipment.

Alternatively, in some other embodiments, for different transmission block sizes possibly used, early data transmission is performed in the Msg3 using the same resource size but different repetition numbers (for example, the aforementioned solution 2). In such embodiments, the information indicating a repetition number included in the uplink grant may be information indicating a repetition number corresponding to a time when the allowed maximum transmission block size is used on a coverage enhancement level of the user equipment.

In whichever case (solution 1 or solution 2), once the maximum transmission block size allowed during the early data transmission is determined, a repetition number corresponding to the maximum transmission block size can be determined according to the indication information in the uplink grant.

Step S230: obtain, according to the allowed maximum transmission block size, candidate values of available transmission block sizes and a resource and a repetition number corresponding to each candidate value.

In some embodiments, each allowed maximum transmission block size and candidate values of a group of available transmission block sizes associated therewith have a predetermined mapping relationship. Specifically, the mapping relationship between each allowed maximum transmission block size and candidate values of a group of available transmission block sizes associated with the allowed maximum transmission block size may be predefined. For example, if the allowed maximum transmission block size is X, then available transmission block sizes corresponding to the allowed maximum transmission block size are X, ($\frac{1}{2}$)*X, ($\frac{1}{4}$)*X, ($\frac{1}{8}$)*X, and so on or approximations thereof. In practice, for compatibility, existing (for example, Rel-13 PUSCH) transmission block sizes close to X, ($\frac{1}{2}$)*X, ($\frac{1}{4}$)*X, ($\frac{1}{8}$)*X, and so on may be used as the available transmission block sizes.

In some other embodiments, each allowed maximum transmission block size is pre-associated with the candidate values of a group of available transmission block sizes. For example, a plurality of groups of available transmission block sizes may be predefined for a possibly broadcast maximum transmission block size in the system, where each group of transmission block sizes corresponds to one allowed maximum transmission block size. In such embodiments, an index of a group that the allowed maximum transmission block size is in may be indicated in the uplink grant. Then, the UE may determine, according to the index information, the group of transmission block sizes available when early data transmission is performed from a plurality of groups of transmission block sizes pre-associated with a maximum transmission block size broadcast by the base station and corresponds to a coverage enhancement level of the user equipment. It should be understood that in such embodiments, once the group of transmission block sizes available when early data transmission is performed, the allowed maximum transmission block size and corresponding candidate values of available transmission block sizes thereof are determined.

After the candidate values of the available transmission block sizes are determined, a resource and a repetition number corresponding to each candidate value may be obtained. For example, in the aforementioned embodiments (for example, the aforementioned solution 1) where for different transmission block sizes possibly used, early data transmission is performed in the Msg3 using the same repetition number but different resource sizes, the repetition number corresponding to each candidate value is the same as the repetition number corresponding to the corresponding allowed maximum transmission block size (which is determined in step S220). The resource corresponding to each candidate value may be part of the resource corresponding to the corresponding allowed maximum transmission block size. For another example, in the aforementioned embodiments (for example, the aforementioned solution 2) where for different transmission block sizes possibly used, early data transmission is performed in the Msg3 using the same resource size but different repetition numbers, the resource corresponding to each candidate value is the same as the resource corresponding to the corresponding allowed maximum transmission block size. The repetition number corresponding to each candidate value may be determined according to the repetition number corresponding to the corresponding allowed maximum transmission block size and a ratio of the candidate value to the corresponding allowed maximum transmission block size.

Step S240: select, according to the size of uplink data to be transmitted, a candidate value of a suitable transmission block size and a resource and a repetition number corresponding thereto to perform the early data transmission in a random access message 3.

Figure 3:
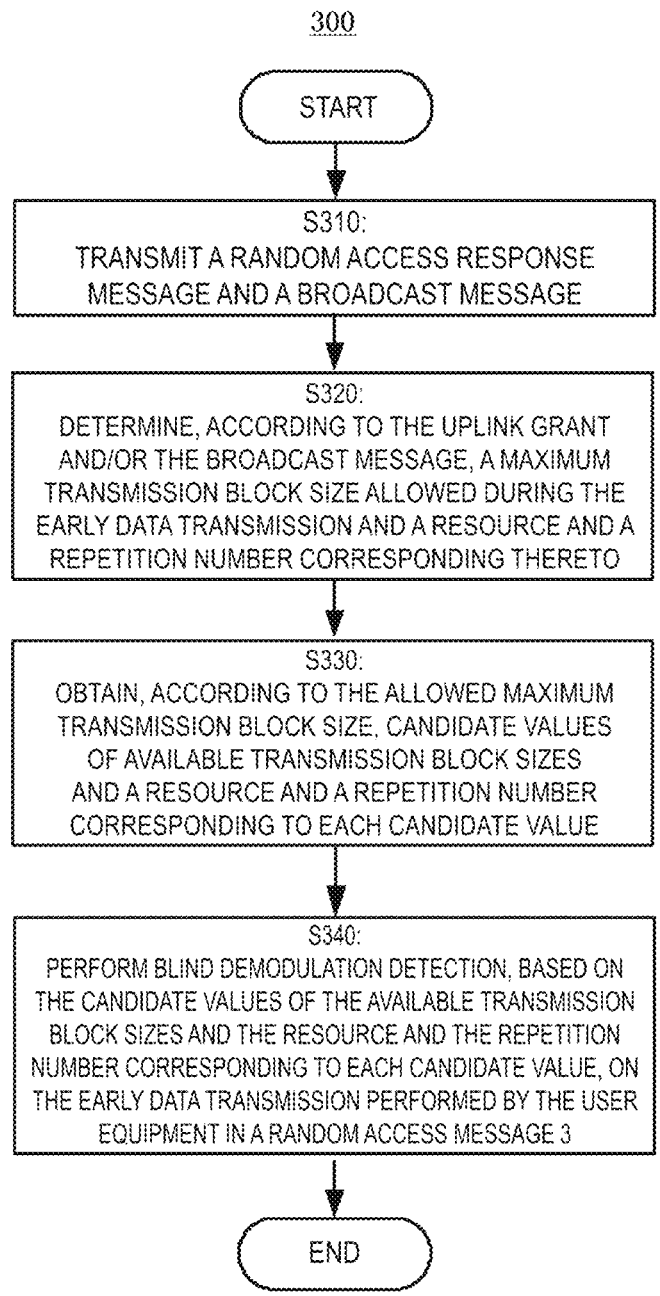
FIG. 3 schematically shows a flowchart illustrating an operation of a method for performing early data transmission according to an embodiment of the present invention on a base station side.

FIG. 3 schematically shows a flowchart illustrating an operation 300 of a method for performing early data transmission according to an embodiment of the present invention on a base station side.

After receiving a random access preamble transmitted by user equipment, the method 300 starts.

As shown in the figure, step S310: a base station transmits a random access response message and a broadcast message. The broadcast message is transmitted periodically, regardless of the sequence in which the user equipment transmits the random access preamble. The random access response message includes an uplink grant for user equipment to perform the early data transmission, where the uplink grant includes information indicating resource allocation and information indicating a repetition number.

In some embodiments, the uplink grant does not need to include information indicating a transmission block size.

In some other embodiments, the uplink grant may include information indicating a transmission block size, for example, may include index information of a maximum transmission block size.

Step S320: determine, according to the uplink grant and/or the broadcast message, a maximum transmission block size allowed during the early data transmission and a resource and a repetition number corresponding thereto.

In some embodiments where the uplink grant does not include information indicating a transmission block size, in step S320, the maximum transmission block size allowed during the early data transmission may be determined according to the broadcast message. Specifically, a maximum transmission block size broadcast by a base station and corresponding to a coverage enhancement level of the user equipment may be used as the maximum transmission block size allowed when early data transmission is performed.

In some embodiments where the uplink grant includes information indicating a transmission block size, in step S320, the maximum transmission block size allowed during the early data transmission may be determined according to the uplink grant and the broadcast message. For example, in an embodiment where a group of transmission block sizes is predefined for a possibly broadcast maximum transmission block size in a system and the uplink grant includes index (for example, an index of the maximum transmission block size in the associated group) information, the maximum transmission block size allowed when early data transmission is performed may be determined according to the index information from a group of transmission block sizes pre-associated with a maximum transmission block size broadcast by the base station and corresponds to a coverage enhancement level of the user equipment. As another example, in an embodiment where a plurality of groups of available transmission block sizes are predefined for a possibly broadcast maximum transmission block size in the system and the uplink grant includes index (for example, an index of an associated group that the maximum transmission block size is in) information, the group of transmission block sizes available when early data transmission is performed (namely, the associated group that the maximum transmission block size is in) may be determined according to the index information from a plurality of groups of transmission block sizes pre-associated with a maximum transmission block size broadcast by the base station and corresponds to a coverage enhancement level of the user equipment.

In some embodiments, the information indicating resource allocation included in the uplink grant may include information indicating resource allocation corresponding to a time when the allowed maximum transmission block size is used on a coverage enhancement level of the user equipment. Then, once the maximum transmission block size allowed during the early data transmission is determined, a resource corresponding to the maximum transmission block size can be determined according to the information indicating resource allocation in the uplink grant.

In some embodiments, for different transmission block sizes possibly used, early data transmission is performed in the Msg3 using the same repetition number but different resource sizes (for example, the aforementioned solution 1). In these embodiments, the information indicating a repetition number included in the uplink grant may be information indicating a unified repetition number corresponding to a coverage enhancement level of the user equipment.

Alternatively, in some other embodiments, for different transmission block sizes possibly used, early data transmission is performed in the Msg3 using the same resource size but different repetition numbers (for example, the aforementioned solution 2). In such embodiments, the information indicating a repetition number included in the uplink grant may be information indicating a repetition number corresponding to a time when the allowed maximum transmission block size is used on a coverage enhancement level of the user equipment.

In whichever case (solution 1 or solution 2), once the maximum transmission block size allowed during the early data transmission is determined, a repetition number corresponding to the maximum transmission block size can be determined according to the indication information in the uplink grant.

Step S330: obtain, according to the allowed maximum transmission block size, candidate values of available transmission block sizes and a resource and a repetition number corresponding to each candidate value.

In some embodiments, each allowed maximum transmission block size and candidate values of a group of available transmission block sizes associated therewith have a predetermined mapping relationship. Specifically, the mapping relationship between each allowed maximum transmission block size and candidate values of a group of available transmission block sizes associated with the allowed maximum transmission block size may be predefined. For example, if the allowed maximum transmission block size is X, then available transmission block sizes corresponding to the allowed maximum transmission block size are X, (½)*X, (¼)*X, (⅛)*X, and so on or approximations thereof. In practice, for compatibility, existing (for example, Rel-13 PUSCH) transmission block sizes close to X, (½)*X, (¼)*X, (⅛)*X, and so on may be used as the available transmission block sizes.

In some other embodiments, each allowed maximum transmission block size is pre-associated with the candidate values of a group of available transmission block sizes. For example, a plurality of groups of available transmission block sizes may be predefined for a possibly broadcast maximum transmission block size in the system, where each group of transmission block sizes corresponds to one allowed maximum transmission block size. In such embodiments, an index of a group that the allowed maximum transmission block size is in may be indicated in the uplink grant. Then, the UE may determine, according to the index information, the group of transmission block sizes available when early data transmission is performed from a plurality of groups of transmission block sizes pre-associated with a maximum transmission block size broadcast by the base station and corresponds to a coverage enhancement level of the user equipment. It should be understood that in such embodiments, once the group of transmission block sizes available when early data transmission is performed, the allowed maximum transmission block size and corresponding candidate values of available transmission block sizes thereof are determined.

After the candidate values of the available transmission block sizes are determined, a resource and a repetition number corresponding to each candidate value may be obtained. For example, in the aforementioned embodiments (for example, the aforementioned solution 1) where for different transmission block sizes possibly used, early data transmission is performed in the Msg3 using the same repetition number but different resource sizes, the repetition number corresponding to each candidate value is the same as the repetition number corresponding to the corresponding allowed maximum transmission block size (which is determined in step S220). The resource corresponding to each candidate value may be part of the resource corresponding to the corresponding allowed maximum transmission block size. For another example, in the aforementioned embodiments (for example, the aforementioned solution 2) where for different transmission block sizes possibly used, early data transmission is performed in the Msg3 using the same resource size but different repetition numbers, the resource corresponding to each candidate value is the same as the resource corresponding to the corresponding allowed maximum transmission block size. The repetition number corresponding to each candidate value may be determined according to the repetition number corresponding to the corresponding allowed maximum transmission block size and a ratio of the candidate value to the corresponding allowed maximum transmission block size.

Step S340: perform blind demodulation detection, based on the candidate values of the available transmission block sizes and the resource and the repetition number corresponding to each candidate value, on the early data transmission performed by the user equipment in a random access message 3.

It should be understood the method shown above is merely exemplary. The method of the present invention is not limited to steps or sequences illustrated above. In the aforementioned methods 200 and 300, only operations related to the present invention are shown. The UE and the base stations may further perform other operations. For example, before step S210, the UE may transmit a preamble to initiate a random access process. After step S340, the base station may further transmit an Msg 4 or the like.

Figure 4:
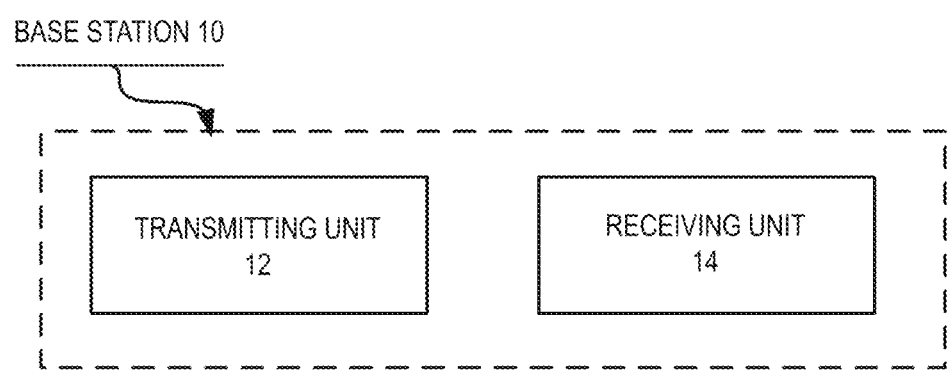
FIG. 4 schematically shows a block diagram of a base station according to an embodiment of the present invention.

FIG. 4 schematically shows a block diagram of a base station 10 according to an embodiment of the present disclosure. As shown in the figure, the base station 10 includes a transmitting unit 12 and a receiving unit 14. Those skilled in the art should understand that the transmitting unit 12 and the receiving unit 14 may be implemented separately or may be implemented together as a single component. It should be further understood that the base station 10 may further include other functional units needed for implementing its functions, such as various processors, memories, RF signal processing units, baseband signal processing units, and other physical downlink channel transmission processing units. However, for simplicity, detailed description of these prior art elements is omitted.

The transmitting unit 12 may be configured to transmit a random access response message and a broadcast message, the random access response message including an uplink grant for user equipment to perform the early data transmission, where the uplink grant includes information indicating resource allocation and information indicating a repetition number.

Specifically, the transmitting unit 12 may transmit, to UE using a physical downlink control channel (PDCCH) and/or a physical downlink shared channel (PDSCH), information such as a maximum granted transmission block size based on each coverage enhancement level and/or the number of resources allocated for the maximum granted transmission block size and/or a repetition number. The information may be physical layer signaling and/or MAC signaling and/or RRC signaling. The RRC signaling may be broadcast signaling, such as system information, or may be UE-specific RRC signaling.

The receiving unit 14 may be configured to perform blind demodulation detection, based on the candidate values of the available transmission block sizes and the resource and the repetition number corresponding to each candidate value, on the early data transmission performed by the user equipment in a random access message 3, where a transmission block size used by a maximum transmission block size allowed during the early data transmission and resource allocation and a repetition number corresponding thereto are determined according to the uplink grant and/or the broadcast message. Candidate values of available transmission block sizes and a resource and a repetition number corresponding to each candidate value are obtained according to the allowed maximum transmission block size.

Specifically, the receiving unit 14 may perform blind detection on a random access message 3 transmitted by the UE according to a coverage enhancement level of the UE, a maximum transmission block size granted for the coverage enhancement level, and the number of resources allocated to the maximum transmission block size and/or a repetition number. The random access message 3 is carried by a physical uplink shared channel (PUSCH).

Figure 5:
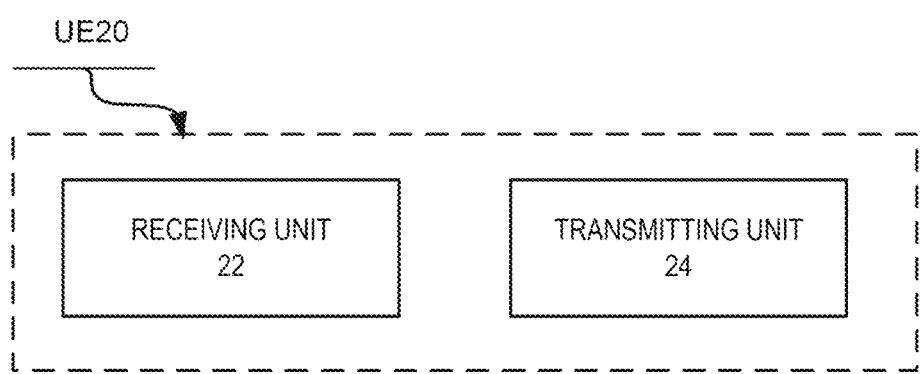
FIG. 5 schematically shows a block diagram of user equipment according to an embodiment of the present disclosure.

FIG. 5 is a block diagram of user equipment (UE) 20 according to an embodiment of the present disclosure. As shown in the figure, the UE 20 includes a receiving unit 22 and a transmitting unit 24. Those skilled in the art should understand that the receiving unit 22 and the transmitting unit 24 may be implemented separately or may be implemented together as a single component. It should be further understood that the UE 20 may further include other functional units needed for implementing its functions, such as various processors, memories, RF signal processing units, baseband signal processing units, and other physical downlink channel transmission processing units. However, for simplicity, detailed description of these prior art elements is omitted.

The receiving unit 22 may be configured to receive a random access response message and a broadcast message, the random access response message including an uplink grant for user equipment to perform the early data transmission, where the uplink grant includes information indicating resource allocation and information indicating a repetition number.

Specifically, the receiving unit 22 may receive, through a PDCCH and/or a PDSCH, information transmitted from an eNB such as a maximum granted transmission block size based on each coverage enhancement level and/or the number of resources allocated for the maximum granted transmission block size and/or a repetition number. The information may be physical layer signaling and/or MAC signaling and/or RRC signaling. The RRC signaling may be broadcast signaling, such as system information, or may be UE-specific RRC signaling.

The transmitting unit 24 may be configured to select, according to the size of uplink data to be transmitted, a candidate value of a suitable transmission block size and a resource and a repetition number corresponding thereto to perform the early data transmission in a random access message 3, where a transmission block size used by a maximum transmission block size allowed during the early data transmission and resource allocation and a repetition number corresponding thereto are determined according to the uplink grant and/or the broadcast message. Candidate values of available transmission block sizes and a resource and a repetition number corresponding to each candidate value are obtained according to the allowed maximum transmission block size.

Specifically, the transmitting unit 24 may select a suitable transmission block size based on the size of data to be transmitted by the UE and according to a coverage enhancement level of the UE, a maximum transmission block size granted for the coverage enhancement level, and the number of resources allocated corresponding to the maximum transmission block size and/or a repetition number, as well as transmit the random access message 3 on a resource corresponding to the selected transmission block size and/or using a repetition number corresponding to the selected transmission block size.

The base station in the present invention is an entity for communicating with user equipment, and may also refer to a Node B or an evolved Node B (eNB) or an access point (AP).

The user equipment in the present invention may also refer to a terminal or an access terminal or a station or a mobile station or the like. The user equipment may be a cellular phone or a personal digital assistant (PDA) or a cordless telephone or a notebook computer or a mobile phone or a smart phone or a handheld device or a netbook or the like.

The physical downlink control channel in the present invention may refer to a PDCCH in 3GPP LTE/LTE-A (Long Term Evolution/Long Term Evolution-Advanced) or an MPDCCH (MTC PDCCH) for machine-type communications or an NPDCCH for narrowband Internet of Things communications or an NR-PDCCH for NR (New Radio, also referred to as 5G) or the like. The physical downlink shared channel may refer to a PDSCH in 3GPP LTE/LTE-A (Long Term Evolution/Long Term Evolution-Advanced) or an NPDSCH for narrowband Internet of Things communications or an NR-PDSCH or the like. The physical uplink shared channel may refer to a PUSCH in 3GPP LTE/LTE-A (Long Term Evolution/Long Term Evolution-Advanced) or an NPUSCH for narrowband Internet of Things communications or an NR-PUSCH or the like.

The base station according to the embodiment of the present invention may be configured to perform the aforementioned method 300. The user equipment according to the embodiment of the present invention may be configured to perform the aforementioned method 200. Their operations will not be repeated here.

Figure 6:
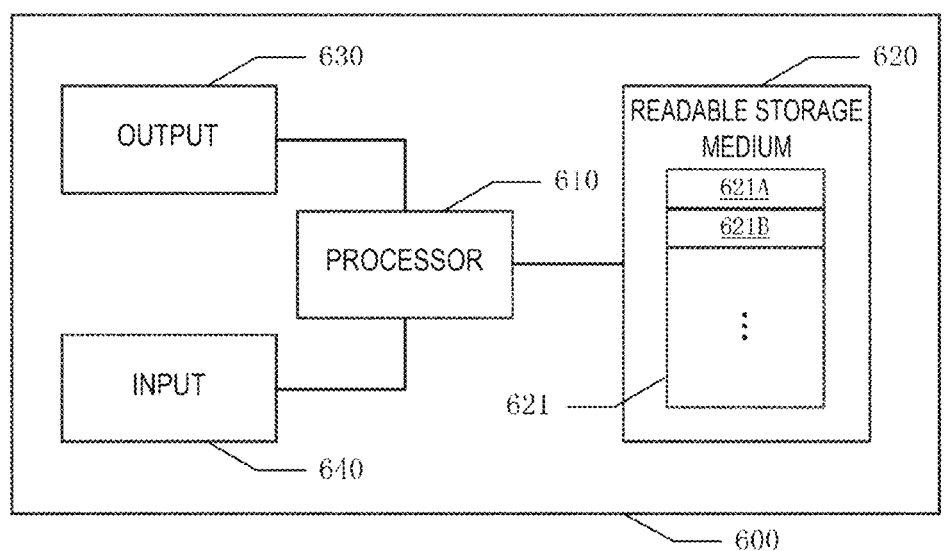
FIG. 6 schematically shows a block diagram of a computing system according to an embodiment of the present disclosure that can be used to implement the base station or user equipment in the present disclosure.
Figure 7:
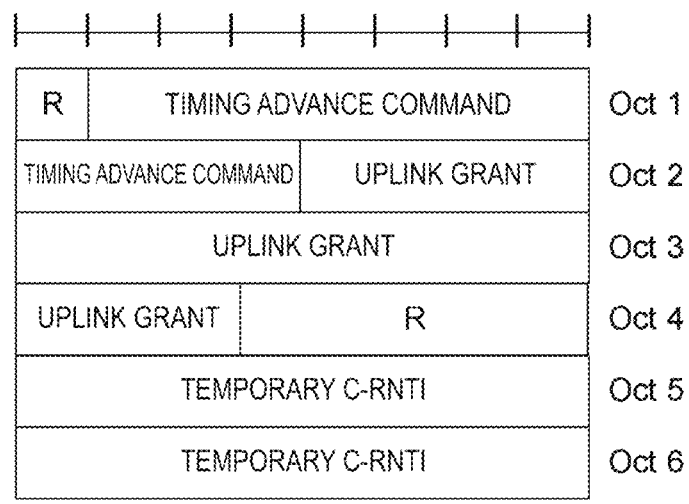
FIG. 7 schematically shows a structural block diagram of a MAC RAR of NB-IoT UE according to an embodiment of the present disclosure.

FIG. 6 schematically shows a block diagram of a computing system according to an embodiment of the present disclosure that can be used to implement the base station or user equipment in the present disclosure.

As shown in FIG. 6, the computing system 600 includes a processor 610, a computer-readable storage medium 620, an output interface 630, and an input interface 640. The computing system 600 may perform the method 200 or 300 described above with reference to the corresponding allowance to perform the early data transmission in a random access process.

Specifically, the processor 610 may include, for example, a general-purpose microprocessor, an instruction set processor and/or a related chip set and/or a special-purpose microprocessor (for example, an application specific integrated circuit (ASIC)). The processor 610 may further include an on-board memory for caching purposes. The processor 610 may be a single processing unit or a plurality of processing units for performing different actions of the method flow described with reference to FIG. 4 or FIG. 5.

The computer-readable storage medium 620 may be, for example, any medium capable of containing, storing, transferring, propagating, or transmitting instructions. For example, the readable storage medium may include, but is not limited to, electrical, magnetic, optical, electromagnetic, infrared, or semiconductor systems, devices, components, or propagation media. Specific examples of the readable storage medium include: a magnetic storage device such as a magnetic tape or a hard drive disc (HDD); an optical storage device such as a compact disc read-only memory (CD-ROM); a memory such as a random access memory (RAM) or a flash memory; and/or a wired/wireless communication link.

The computer-readable storage medium 620 may include a computer program 621, where the computer program 621 may include code/computer-executable instructions that, when executed by the processor 610, cause the processor 610 to perform, for example, the method flow described above with reference to FIG. 2 or FIG. 3 and any variations thereof.

The computer program 621 may be configured to have, for example, computer program code including computer program modules. For example, in an exemplary embodiment, the code in the computer program 621 may include one or a plurality of program modules, for example, include 621A, a module 621B, . . . . It should be noted that the division and the number of the modules are not fixed. Those skilled in the art can use proper program modules or program module combinations according to the actual situation. When executed by the processor 610, the program module combinations cause the processor 610 to perform the method flow described above with reference to FIG. 2 or FIG. 3 or any variations thereof.

According to the embodiment of the present disclosure, the processor 610 may use the output interface 630 and the input interface 640 to perform the method flow described above with reference to FIG. 2 or FIG. 3 and any variations thereof.

The technical solutions of the present invention will be illustrated in more detail below through some examples in view of the aforementioned two solutions for MTC and NB-IoT. It should be understood that the following exemplary embodiments are merely used as examples and not for limitation, and the solutions of the present invention can be used similarly in other systems that support early data transmission in a random access process.

Embodiment 1

For Rel-15 MTC, Perform Uplink Early Data Transmission on Different Resource Sizes Using the Same Repetition Number for a Plurality of Different Transmission Block Sizes Possibly Used.

In the existing 3GPP standard specifications related to MTC, the smallest resource allocation unit for a PUSCH is one physical resource block (PRB). Two coverage enhancement modes are supported: a coverage enhancement mode A (CE mode A) and a coverage enhancement mode B (CE mode B). The CE mode A is used for UE having good channel conditions, requiring no coverage enhancement or relatively small coverage enhancement, or requiring no repeated transmission or very few repeated transmissions. The CE mode B is used for UE having poor channel conditions, requiring large or very large coverage enhancement, or requiring many or very many repeated transmissions. Scheduling information of an Msg3 is indicated by an uplink grant (UL Grant) of a random access response (RAR). Table 1 is the content of the RAR uplink grant (see non-patent literature 3: 3GPP TS 36.213 V13.7.0 (2017-09), Table 6-2 in the physical layer step).

TABLE 1

Content of RAR uplink grant

| DCI content | CE Mode A | CE Mode B |
|---|---|---|
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4 - N_{NB}^{index}$ | 0 |
| Total Nr-bits | 20 | 12 |

The "Msg3 PUSCH narrowband index" field in the table indicates the position of a narrowband in the system bandwidth, where one narrowband is six consecutive physical resource blocks in the frequency domain; the "Msg3 PUSCH Resource allocation" field refers to a resource allocated to a PUSCH carrying an Msg3 in the narrowband; the "Number of Repetitions for Msg3 PUSCH" field refers to a repeated transmission number of the PUSCH carrying the Msg3; the "MCS" field refers to a modulation and coding level used for transmitting the Msg3; and the "TBS" field refers to a transmission block size used for transmitting the Msg3. Other content will not be illustrated one by one and can be seen in non-patent literature 3.

The design of the RAR uplink grant for uplink early data transmission may adopt the design of an existing RAR uplink grant. That is, the total number of bits and character fields included are not changed, and some character fields are reinterpreted. Alternatively, the total number of bits may be kept unchanged and the number of character fields of the uplink grant and the content of each character field may be redesigned. With consideration to backward compatibility, reserved bits in the RAR may be used to indicate whether the RAR uplink grant is an existing uplink grant or an uplink grant for early data transmission. Alternatively, a random access-radio network temporary identity (RA-RNTI) may be used to distinguish whether the RAR uplink grant is an existing uplink grant or an uplink grant for early data transmission.

Based on the consensus reached by 3GPP RAN2, a base station can know a coverage enhancement level of UE by receiving a random access Msg1 and can obtain, according to the coverage enhancement level, a maximum possible transmission block size of the UE or the maximum amount of data to be transmitted by the UE using early data transmission, and cannot know the amount of data to be actually transmitted by the UE using early data transmission. Thus, the base station can only allocate resources to the Msg3 PUSCH of the UE and determine a repeated transmission number according to the maximum possible transmission block size of the UE. If the amount of uplink data to be transmitted by the UE using early data transmission is less than the maximum transmission block size, additional power loss of the UE will be caused. A group of TBSs may be defined for a maximum transmission block size of each coverage enhancement level, and the UE selects, according to the size of data to be transmitted for early data transmission in the Msg3, a TBS value close to the data size to perform the early data transmission. Thus, the power consumption of the UE can be reduced. Detailed illustration is provided below with the CE Mode B and one group containing four TBS values. The determination of a transmission block size, a resource, and a repetition number is mainly considered.

1. How to Obtain Four TBS Values

Four TB S values are obtained in the following three manners:

Manner 1:

For UE having a certain coverage enhancement level, a maximum transmission block size for the UE to perform the early data transmission in the Msg3 is equal to a maximum TBS (X) broadcast based on the coverage enhancement level. Other TBS values are (½)*X, (¼)*X, and (⅛)*X. For example, if a maximum TBS broadcast for UE having a coverage enhancement level 1 is 1000 bits, then the other three TBS values are 500 bits, 250 bits, and 125 bits. Since the TBS values of 500, 250, and 125 bits are not values in the following Table 2, Table of transmission block size for Rel-13 PUSCH (see non-patent literature 3: 3GPP TS 36.213 V13.7.0 (2017-09), Table 7.1.7.2.1-1 in the physical layer step), TBS values closest to the aforementioned values in Table 2 are selected to replace the aforementioned values. Thus, the following TBS values can be obtained: 504 bits, 256 bits, and 120 bits.

In this manner, the UE can directly obtain the four TBS values according to the maximum TBS broadcast by the base station for the corresponding coverage enhancement level of the UE.

Therefore, when early data transmission is performed in the Msg3, a TBS character field in the RAR uplink grant may not be used.

TABLE 2

Table of transmission block size for Rel-13 PUSCH

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |

Manner 2:

A group of TBSs is predefined for each possibly broadcast maximum TBS, and each group of TBSs contains four TBS values. The UE can know, according to a maximum TBS broadcast by the base station for a corresponding coverage enhancement level of the UE, a group of TBSs corresponding to the broadcast maximum TBS. Then, one TBS value in the group of TBSs is indicated by a TBS character field in an RAR uplink grant. The obtained TBS value is a maximum TBS (Y) that can be used by the UE to perform the early data transmission in the Msg3. Other TBS values are (½)*Y, (¼)*Y, and (⅛)*Y. For example, a TBS of 1000 bits is a maximum TBS possibly broadcast by the base station, and a group of TBSs predefined for the maximum TBS is {1000, 808, 600, 328}. The TBS character field in the RAR uplink grant has 2 bits, where 00 corresponds to 1000, 01 corresponds to 808, 10 corresponds to 600, and 11 corresponds to 328. Then, when the TBS character field in the RAR uplink grant is 01, it can be recognized that the maximum TBS that can be used by the UE when performing early data transmission in the Msg3 is 808. At this time, the other three TBSs should be 404, 202, and 101 bits. Since the TBS values of 404, 202, and 101 bits are not values in the following Table 2, Table of transmission block size for Rel-13 PUSCH (see non-patent literature 3: 3GPP TS 36.213 V13.7.0 (2017-09), Table 7.1.7.2.1-1 in the physical layer step), TBS values closest to the aforementioned values in Table 2 are selected to replace the aforementioned values. Thus, the following three TBS values can be obtained: 408, 208, and 104 bits.

Manner 3:

Four groups of TBSs are predefined for each possibly broadcast maximum TBS, each group of TBSs containing four TBS values. The UE can know, according to a maximum TBS broadcast by the base station for a corresponding coverage enhancement level of the UE, four groups of TBSs corresponding to the broadcast maximum TBS. Then, one group of TBSs in the four groups of TBSs is indicated by a TBS character field in an RAR uplink grant. Thus, when the UE performs early data transmission in the Msg3, one group of TBSs, namely four TBS values, can be obtained. For example, a TBS of 1000 bits is a maximum TBS possibly broadcast by the base station, and the following four groups of TBSs are predefined for the maximum TBS: {1000, 504, 256, 120}, {808, 408, 208, 104}, {600, 296, 144, 88}, {328, 176, 88, 56}. The TBS character field in the RAR uplink grant has 2 bits, and the character field may be used to indicate one group in the four groups of TBSs for the UE for performing early data transmission in the Msg3.

2. How to Determine Resources for the Four TBS Values in the Aforementioned Section 1

An Msg3 PUSCH resource allocation character field exists in an RAR uplink grant. Like Rel-13 CE mode B, the character field has three bits to indicate physical resource block (PRB) allocation in a narrowband. The specific content is shown in Table 3.

TABLE 3

| 3-bit resource allocation field | Allocated resource block |
|---|---|
| '000' | First PRB in narrowband |
| '001' | Second PRB in narrowband |
| '010' | Third PRB in narrowband |
| '011' | Fourth PRB in narrowband |
| '100' | Fifth PRB in narrowband |
| '101' | Sixth PRB in narrowband |
| '110' | First and second PRBs in narrowband |
| '111' | Third and fourth PRBs in narrowband |

As can be seen from Table 3, the number of PRBs that can be allocated to an Msg3 PUSCH is 1 PRB or 2 PRBs. It can be specified that the resource allocated in the RAR uplink grant corresponds to a maximum TBS for the UE to perform the early data transmission in an Msg3. That is, if the UE chooses to use the maximum TBS to perform the early data transmission, then the UE will transmit the Msg3 on the resource allocated in the RAR uplink grant. Resources for transmission of other three TBSs will be derived from the resource allocated in the RAR uplink grant. If the resource allocated in the RAR uplink grant is one PRB, then it is specified that resources of 1 PRB, 6 subcarriers, 3 subcarriers, and 2 subcarriers may be respectively used for transmission of the four TBS values obtained in the aforementioned section 1. The four resource numbers in descending order correspond to the four values of TBSs in descending order. If the resource allocated in the RAR uplink grant is 2 PRBs, then it is specified that resources of 2 PRBs, 1 PRB, 6 subcarriers, and 3 subcarriers may be respectively used for transmission of the four TBS values obtained in the aforementioned section 1. The four resource numbers in descending order correspond to the four values of TBSs in descending order. The position of the 6 subcarriers, 3 subcarriers, 2 subcarriers, or 1 PRB is predetermined. For example, in the case that the allocated resource is 1 PRB, the 6 subcarriers, 3 subcarriers, or 2 subcarriers thereof are the first 6 subcarriers, 3 subcarriers, or 2 subcarriers in the allocated 1 PRB; and in the case that the allocated resource is 2 PRBs, the 1 PRB, 6 subcarriers, or 3 subcarriers are the first 1 PRB in the allocated 2 PRBS, and the first 6 subcarriers and 3 subcarriers in the first 1 PRB.

3. How to Determine a Repetition Number for the Four TBS Values in the Aforementioned Section 1

A character field of Number of Repetitions for Msg3 PUSCH exists in an RAR uplink grant. Like the definition in Rel-13 CE mode B, the character field has 3 bits for indicating a repeated transmission number of an Msg3 PUSCH.

For early data transmission in an Msg3, the character field indicates the repeated transmission number of the Msg3 PUSCH when a maximum TBS is used for a certain coverage enhancement level. For the other three TBS values of the same coverage enhancement level, the repeated transmission number of the Msg3 PUSCH the same as that for the maximum TBS will be used. That is, the repetition number indicated in the character field applies to all TBS values of the same coverage enhancement level. That is, the same repetition number applies to all TBS values of the same coverage enhancement level.

4. Behaviors of UE and Base Station

The UE can know its own coverage enhancement level according to downlink reference signal received power (RSRP). When the UE wants to perform the early data transmission in an Msg3, the UE will select a PRACH resource corresponding to the coverage enhancement level thereof to transmit an Msg1.

The base station broadcasts a maximum possible TBS of each coverage enhancement level through system broadcast information, or broadcasts a maximum data transmission amount when the UE is allowed to perform the early data transmission in the Msg3. Or the base station notifies the UE, through RAR uplink grant information, of a maximum TBS available when the UE performs early data transmission in the Msg3.

The UE may obtain, by receiving the system broadcast information or the RAR uplink grant information, a maximum TB S corresponding to a coverage enhancement level thereof when the UE wants to perform the early data transmission in the Msg3. Or the UE may obtain, by receiving the system broadcast information or the RAR uplink grant information, a maximum data transmission amount corresponding to the coverage enhancement level thereof when the base station allows the UE to perform the early data transmission in the Msg3.

When the UE wants to perform the early data transmission in the Msg3, the UE may, according to the maximum TBS obtained by the UE and corresponding to the coverage enhancement level of the UE, obtain four TBS values using the method "How to Obtain Four TBS Values" in section 1 of this embodiment; obtain uplink transmission resources of an Msg3 PUSCH corresponding to the four TBS values using the method "How to Determine Resources for the Four TBS Values in the Aforementioned Section 1" in section 2 of this embodiment; and obtain a repeated transmission number of the Msg3 PUSCH corresponding to the four TBS values using the method "How to Determine a Repetition Number for the Four TBS Values in the Aforementioned Section 1" in section 3 of this embodiment. Thus, when the UE wants to perform the early data transmission in the Msg3, the UE selects a suitable TBS value according to the size of data the UE wants to transmit and performs transmission of the Msg3 PUSCH using a repeated transmission number corresponding to the TBS on a resource corresponding thereto.

The base station knows, by receiving the Msg1, that the UE wants to perform the early data transmission in the Msg3, and knows the coverage enhancement level of the UE. The base station may obtain, according to the maximum TBS broadcast by the base station and corresponding to the coverage enhancement level of the UE or according to the maximum TBS indicated by the base station in the RAR uplink grant information, a maximum TBS when the UE performs early data transmission in the Msg3. Then, four TBS values are obtained using the method "how to obtain four TBS values" in section 1 of this embodiment; uplink transmission resources of an Msg3 PUSCH corresponding to four TBS values are obtained using the method "How to Determine Resources for the Four TBS Values in The Aforementioned Section 1" in section 2 of this embodiment; and a repeated transmission number of the Msg3 PUSCH corresponding to the four TBS values is obtained using the method "How to Determine a Repetition Number for the Four TBS Values in the Aforementioned Section 1" in section 3 of this embodiment. Therefore, on the Msg3 PUSCH resources corresponding to the four TBS values, the base station can perform blind detection on the Msg3 PUSCH using the repetition number of the Msg3 PUSCH corresponding to the four TBS values. Thus, data transmitted by the UE using early data transmission in the Msg3 is detected.

If the amount of the data to be transmitted by the UE using early data transmission in the Msg3 is greater than the maximum TBS indicated in the RAR uplink grant information, the UE will give up transmitting the data to be transmitted by the UE using early data transmission in the Msg3, but transmit existing (Legacy) Msg3 information using early data transmission, namely, only perform existing Msg3 transmission. That is, the UE selects a suitable TBS value according to the amount of the existing Msg3 information, and performs transmission of the Msg3 PUSCH using a repeated transmission number corresponding to the TBS on a resource corresponding to the TBS. The content transmitted by the Msg3 PUSCH is only the existing Msg3 information.

Embodiment 2

For Rel-15 NB-1° T, Perform Uplink Early Data Transmission on Different Resource Sizes Using the Same Repetition Number for a Plurality of Different Transmission Block Sizes Possibly Used.

In the existing 3GPP standard specifications related to NB-IoT, an RAR UL Grant used for scheduling an Msg3 NPUSCH has 15 bits, the specific content of which is as follows:

uplink subcarrier interval Δf: '0'=3.75 kHz or '1'=15 kHz—1 bit
allocated subcarrier indicator—6 bits
scheduling delay—2 bits
Msg3 repetition number—3 bits
modulation and coding scheme index (indicating a TBS, a modulation mode, and a resource unit number (Resource Unit: RU))—3 bits The definition of the modulation and coding scheme index in the RAR uplink grant is shown in Table 4.

TABLE 4

Modulation and Coding Scheme Index for Msg3 NPUSCH

| MCS Index $I_{MCS}$ | Modulation Δf = 3.75 kHz or Δf = 15 kHz and $I_{SC}$ = 0, 1, . . . , 11 | Modulation Δf = 15 kHz and $I_{SC}$ > 11 | Number of RUs $N_{RU}$ | TBS |
|---|---|---|---|---|
| '000' | Pi/2 BPSK | QPSK | 4 | 88 bits |
| '001' | Pi/4 QPSK | QPSK | 3 | 88 bits |
| '010' | Pi/4 QPSK | QPSK | 1 | 88 bits |
| '011' | Reserved | Reserved | Reserved | Reserved |
| '100' | Reserved | Reserved | Reserved | Reserved |
| '101' | Reserved | Reserved | Reserved | Reserved |
| '110' | Reserved | Reserved | Reserved | Reserved |
| '111' | Reserved | Reserved | Reserved | Reserved |

The specific content of the RAR UL Grant of NB-IoT can be seen in non-patent literature 3: 3GPP TS 36.213 V13.7.0 (2017-09), section 16.3.3: narrowband random access response grant in the physical layer step.

It can be seen from the aforementioned RAR uplink grant that no separate resource unit allocation information exists; instead, 3 bits are used to indicate, in a unified manner, a TBS, a modulation mode, and a resource unit number. This is different from normal NPUSCH scheduling, where the normal NUPUSCH scheduling refers to carrying scheduling information of an NPUSCH by an NPDCCH, namely, scheduling the NPUSCH by the NPDCCH rather than scheduling the NPUSCH by an RAR uplink grant. The normal NPUSCH scheduling uses a downlink control information (DCI) format N0 (DCI Format N0). The specific content is as follows:

distinguishing tag of format N0/N1—1 bit
allocated subcarrier indicator—6 bits
resource allocation—3 bits
scheduling delay—2 bits
modulation and coding scheme—4 bits
redundancy version—1 bit
repetition number—3 bits
new data indicator—1 bit
DCI subframe repetition number—2 bits The specific description of the DCI format N0 can be seen in non-patent literature 4: 3GPP TS 36.212 V13.6.0 (2017-06), section 6.4.3.1 in multiplexing and channel coding.

The specific structure of a MAC RAR of NB-IoT is shown in FIG. 3 (see non-patent literature 5: 3GPP TS 36.321 V13.7.0 (2017-09), section 6.1.5: MAC protocol data unit (PDU) of RAR, in media access control protocol specifications).

It can be seen from FIG. 3 that although the RAR uplink grant is 15 bits, the RAR has 5 bits reserved. However, a resource allocation character field in the normal NPUSCH scheduling needs only 3 bits. Therefore, the existing reserved states in the modulation and coding scheme index for an Msg3 NPUSCH and/or reserved bits in the RAR are used to design an RAR uplink grant for early data transmission or a MAC RAR for early data transmission.

In the design of the RAR uplink grant for early data transmission, the uplink subcarrier spacing, allocated subcarrier indicator, and scheduling delay character fields in the existing RAR uplink grant may be kept unchanged. The determination of a TBS, a resource unit number, and a repetition number of the Msg3 NPUSCH when early data transmission is performed in an Msg3 is mainly considered. Several possible methods for determining the TBS, the resource unit number, and the repetition number are discussed in detail below.

Method 1: use three character fields in an RAR uplink grant to respectively indicate the TBS, the resource unit number, and the repetition number.

The RAR uplink grant for performing early data transmission by NB-IoT UE in the Msg3 may be redesigned. That is, a 3-bit resource allocation character field is added, the definition of which is the same as that of the resource allocation character field in the DCI format N0 in the normal NPSUCH scheduling. Moreover, the MCS index character field in the currently existing RAR uplink grant is stored, but the size thereof may be different from the size of the MCS index character field in the existing RAR uplink grant. For example, the size is 2 bits rather than 3 bits. Other character fields in the existing RAR uplink grant may be kept unchanged. In this way, a method similar to that for design for MTC in Embodiment 1 can be applied to NB-IoT.

Since reserved bits in the RAR are used to indicate resource allocation of the Msg3 NPUSCH for early data transmission, the total number of RAR bits of the NB-IoT UE remains unchanged. With consideration to backward compatibility, remaining reserved bits in the RAR may be used to indicate whether the RAR uplink grant is an existing uplink grant or an uplink grant for early data transmission. Alternatively, a random access-radio network temporary identity (RA-RNTI) may be used to distinguish whether the RAR uplink grant is an existing uplink grant or an uplink grant for early data transmission.

Based on the consensus reached by 3GPP RAN2, a base station can know a coverage enhancement level of UE by receiving a random access Msg1 and can obtain, according to the coverage enhancement level, a maximum possible transmission block size of the UE or the maximum amount of data to be transmitted by the UE using early data transmission, but cannot know the amount of data to be actually transmitted by the UE when using early data transmission. Thus, the base station can only allocate resources to the Msg3 PUSCH of the UE and determine a repeated transmission number according to the maximum possible transmission block size of the UE. If the amount of uplink data to be transmitted by the UE using early data transmission is less than the maximum transmission block size, additional power loss of the UE will be caused. A group of TBSs may be defined for a maximum transmission block size of each coverage enhancement level, and the UE selects, according to the size of data to be transmitted for early data transmission in the Msg3, a TBS value close to the data size to perform the early data transmission. Thus, the power consumption of the UE can be reduced. Detailed illustration is provided below with one group containing four TBS values.

1. Determination of TB S Values

Four TB S values are obtained in the following three manners:

Manner 1:

For UE having a certain coverage enhancement level, a maximum transmission block size for the UE to perform the early data transmission in the Msg3 is equal to a maximum TBS (X) broadcast based on the coverage enhancement level. Other TBS values are $(1/2)*X$, $(1/4)*X$, and $(1/8)*X$. For example, if a maximum TBS broadcast for UE having a coverage enhancement level 1 is 1000 bits, then the other three TBS values are 500 bits, 250 bits, and 125 bits. Since the TBS values of 500, 250, and 125 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following TBS values can be obtained: 504 bits, 256 bits, and 120 bits.

In this manner, the UE can directly obtain the four TBS values according to the maximum TBS broadcast by the base station for the corresponding coverage enhancement level of the UE. Therefore, when early data transmission is performed in the Msg3, a TBS character field in the RAR uplink grant may not be used.

TABLE 5

NPUSCH TBS table

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | |
| 8 | 120 | 256 | 392 | 536 | 680 | 808 | | |
| 9 | 136 | 296 | 456 | 616 | 776 | 936 | | |
| 10 | 144 | 328 | 504 | 680 | 872 | 1000 | | |
| 11 | 176 | 376 | 584 | 776 | 1000 | | | |
| 12 | 208 | 440 | 680 | 1000 | | | | |

Manner 2:

A group of TBSs is predefined for each possibly broadcast maximum TBS, each group of TBSs containing four TBS values. The UE can know, according to a maximum TBS broadcast by the base station for a corresponding coverage enhancement level of the UE, a group of TBSs corresponding to the broadcast maximum TBS. Then, one TBS value in the group of TBSs is indicated by a TBS character field in an RAR uplink grant. The obtained TBS value is a maximum TBS (Y) that can be used by the UE to perform the early data transmission in the Msg3. Other TBS values are $(1/2)*Y$, $(1/4)*Y$, and $(1/8)*Y$. For example, a TBS of 1000 bits is a maximum TBS possibly broadcast by the base station, and a group of TBSs predefined for the maximum TBS is {1000, 808, 600, 328}. The TBS character field in the RAR uplink grant has 2 bits, where 00 corresponds to 1000, 01 corresponds to 808, 10 corresponds to 600, and 11 corresponds to 328. Then, when the TBS character field in the RAR uplink grant is 01, it can be recognized that the maximum TBS that can be used by the UE when performing early data transmission in the Msg3 is 808. At this time, the other three TBSs should be 404, 202, and 101 bits. Since the TBS values of 404, 202, and 101 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following three TBS values can be obtained: 408, 208, and 104 bits.

Manner 3:

Four groups of TBSs are predefined for each possibly broadcast maximum TBS, each group of TBSs containing four TBS values. The UE can know, according to a maximum TBS broadcast by the base station for a corresponding coverage enhancement level of the UE, four groups of TBSs corresponding to the broadcast maximum TBS. Then, one group of TBSs in the four groups of TBSs is indicated by a TBS character field in an RAR uplink grant. Thus, one group of TBSs, namely, four TBS values, when the UE performs early data transmission in the Msg3 can be obtained. For example, a TBS of 1000 bits is a maximum TBS possibly broadcast by the base station. The following four groups of TBSs are predefined for the maximum TBS: {1000, 504, 256, 120}, {808, 408, 208, 104}, {600, 296, 144, 88}, and {328, 176, 88, 56}. The TBS character field in the RAR uplink grant has 2 bits, and the character field may be used to indicate one group in the four groups of TBSs for the UE for performing early data transmission in the Msg3.

2. Determination of Resources

As described above, a 3-bit resource allocation character field is added in an RAR uplink grant of NB-IoT. The definition of the resource allocation character field is the same as that of the resource allocation character field in the normal NPUSCH scheduling. The definition of the 3-bit resource character field is shown in Table 6 (see non-patent literature 3: 3GPP TS 36.213 V13.7.0 (2017-09), Table 16.5.1.1-2 in the physical layer step).

TABLE 6

NPUSCH Resource Unit Number

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

It can be known from Table 6 that the numbers of resource units that can be allocated to the NPUSCH are 1, 2, 3, 4, 5, 6, 8, and 10. It can be specified that the resource allocated in the RAR uplink grant corresponds to a maximum TBS for the UE to perform the early data transmission in an Msg3. That is, if the UE chooses to use the maximum TBS to perform the early data transmission, then the UE will transmit the Msg3 on the resource allocated in the RAR uplink grant. Resources for transmission of other three TBSs will be derived from the resource allocated in the RAR uplink grant. For example, if the number of resource units allocated in the RAR uplink grant is 10, then it is specified that 10, ceil(10/2)=5, ceil(10/4)=3, and ceil(10/8)=2 resource units in the allocated 10 resource units may be respectively used for transmission of the four TBS values obtained in the aforementioned section 1. The four resource unit numbers in descending order correspond to the four TBS values of TBSs in descending order. If the resource allocated in the RAR uplink grant is 8 resource units, it is specified that 8, ceil(8/2)=4, ceil(8/4)=2, and ceil(8/8)=1 resource units in the allocated 8 resource units may be respectively used for transmission of the four TBS values obtained in the aforementioned section 1. The four resource unit numbers in descending order correspond to the four TBS values of TBSs in descending order. The following are predetermined: positions of the 10, 5, 3, and 2 resource units in the aforementioned 10 resource units or the 8, 4, 2; and 1 resource units in the aforementioned 8 resource units. For example, in the case that 10 resource units are allocated, the 5, 3, and 2 resource units are the first 5, 3, and 2 resource units in the allocated 10 resource units; and in the case that 8 resource units are allocated, the 4, 1, and 1 resource units are the first 4, 2, and 1 resource units in the allocated 8 resource units.

3. Determination of Repetition Number

A character field of Msg3 repetition number exists in an RAR uplink grant. Like the definition of an RAR uplink grant of Rel-13 NB-IoT, the character field has 3 bits for indicating a repeated transmission number of an Msg3 PUSCH.

For early data transmission in an Msg3, the character field indicates the repeated transmission number of the Msg3 NPUSCH when a maximum TBS is used for a certain coverage enhancement level. For the other three TBS values of the same coverage enhancement level, the repeated transmission number of the Msg3 NPUSCH the same as that for the maximum TBS will be used. That is, the repetition number indicated in the character field applies to all TBS values of the same coverage enhancement level. That is, the same repetition number applies to all TBS values of the same coverage enhancement level.

4. Behaviors of UE and Base Station

The UE can know its own coverage enhancement level according to downlink reference signal received power (RSRP). When the UE wants to perform the early data transmission in an Msg3, the UE will select a PRACH resource corresponding to the coverage enhancement level thereof to transmit an Msg1.

The base station broadcasts a maximum possible TBS of each coverage enhancement level through system broadcast information, or broadcasts a maximum data transmission amount when the UE is allowed to perform the early data transmission in the Msg3. Or the base station notifies the UE, through RAR uplink grant information, of a maximum TBS available when the UE performs early data transmission in the Msg3.

The UE may obtain, by receiving the system broadcast information or the RAR uplink grant information, a maximum TBS corresponding to a coverage enhancement level thereof when the UE wants to perform the early data transmission in the Msg3. Or the UE may obtain, by receiving the system broadcast information or the RAR uplink grant information, a maximum data transmission amount corresponding to the coverage enhancement level thereof when the base station allows the UE to perform the early data transmission in the Msg3.

When the UE wants to perform the early data transmission in the Msg3, the UE may, according to the maximum TBS obtained by the UE and corresponding to the coverage enhancement level of the UE, obtain four TBS values using the method "Determination of TBS Values" in section 1 of this embodiment; obtain uplink transmission resources of an Msg3 NPUSCH corresponding to the four TBS values using the method "Determination of Resources" in section 2 of this embodiment; and obtain a repeated transmission number of the Msg3 NPUSCH corresponding to the four TBS values using the method "Determination of Repetition Number" in section 3 of this embodiment. Thus, when the UE wants to perform the early data transmission in the Msg3, the UE selects a suitable TBS value according to the size of data the UE wants to transmit, and performs transmission of the Msg3 NPUSCH using a repeated transmission number corresponding to the TBS on a resource corresponding to the TBS.

The base station knows, by receiving the Msg1, that the UE wants to perform the early data transmission in the Msg3, and knows the coverage enhancement level of the UE. The base station may obtain, according to the maximum TBS broadcast by the base station and corresponding to the coverage enhancement level of the UE or according to the maximum TBS indicated by the base station in the RAR uplink grant information, a maximum TBS when the UE performs early data transmission in the Msg3. Then, four TBS values are obtained using the method "Determination of TBS Values" in section 1 of this embodiment; uplink transmission resources of an Msg3 NPUSCH corresponding to the four TBS values are obtained using the method "Determination of Resources" in section 2 of this embodiment; and a repeated transmission number of the Msg3 NPUSCH corresponding to the four TBS values is obtained using the method "Determination of Repetition Number" in section 3 of this embodiment. Therefore, on the Msg3 NPUSCH resources corresponding to the four TBS values, the base station can perform blind detection on the Msg3 PUSCH using the repetition number of the Msg3 NPUSCH corresponding to the four TBS values. Thus, data transmitted by the UE using early data transmission in the Msg3 is detected.

If the amount of the data to be transmitted by the UE using early data transmission in the Msg3 is greater than the maximum TBS indicated in the RAR uplink grant information, the UE will give up transmitting the data to be transmitted by the UE using early data transmission in the Msg3, but transmit existing (Legacy) Msg3 information using early data transmission, namely, only perform existing Msg3 transmission. That is, the UE selects a suitable TBS value according to the amount of the existing Msg3 information, and performs transmission of the Msg3 NPUSCH using a repeated transmission number corresponding to the TBS on a resource corresponding to the TBS. The content transmitted by the Msg3 NPUSCH is only the existing Msg3 information.

Method 2: use two character fields in an RAR uplink grant to indicate the TBS, the resource unit number, and the repetition number. One character field is used to indicate, in a unified manner, the TBS and the resource unit number, and the other character field is used to separately indicate the repetition number.

In the existing 3GPP standard specifications related to NB-IoT, an RAR UL Grant used for scheduling an Msg3 NPUSCH has 15 bits, the specific content of which is as follows:

uplink subcarrier interval Δf: '0'=3.75 kHz or '1'=15 kHz—1 bit allocated subcarrier indicator—6 bits scheduling delay—2 bits Msg3 repetition number—3 bits modulation and coding scheme index (indicating a TBS, a modulation mode, and a resource unit number (Resource Unit: RU))—3 bits The definition of the modulation and coding scheme index in the RAR uplink grant is shown in Table 4. The specific content of the RAR UL Grant of NB-IoT can be seen in non-patent literature 3: 3GPP TS 36.213 V13.7.0 (2017-09), section 16.3.3: narrowband random access response grant in the physical layer step.

It can be seen from the aforementioned RAR uplink grant that no separate resource unit allocation information exists; instead, 3 bits are used to indicate, in a unified manner, a TBS, a modulation mode, and a resource unit number. It can be seen from Table 4 that the existing RAR uplink grant uses only 3 states in 8 states of 3 bits to indicate combinations of TBSs, modulation modes, and resource unit numbers of the Msg3 NPUSCH, and further, 5 states are reserved states. The 5 reserved states may be used to indicate the TBS, the modulation mode, and the resource unit number for the Msg3 NPUSCH performing early data transmission in the Msg3. The other content in the existing RAR uplink grant remains unchanged. For example, the modulation and coding scheme index table shown in Table 7 may be designed.

TABLE 7

Modulation and Coding Scheme Index for Msg3 NPUSCH

| MCS Index $I_{MCS}$ | Modulation $\Delta f = 3.75$ kHz or $\Delta f = 15$ kHz and $I_{SC} = 0, 1, \ldots, 11$ | Modulation $\Delta f = 15$ kHz and $I_{SC} > 11$ | Number of RUs $N_{RU}$ | TBS |
|---|---|---|---|---|
| '000' | Pi/2 BPSK | QPSK | 4 | 88 bits |
| '001' | Pi/4 QPSK | QPSK | 3 | 88 bits |
| '010' | Pi/4 QPSK | QPSK | 1 | 88 bits |
| '011' | Pi/4 QPSK | QPSK | 10 | TBS3 |
| '100' | Pi/4 QPSK | QPSK | 8 | TBS4 |
| '101' | Pi/4 QPSK | QPSK | 6 | TBS5 |
| '110' | Pi/4 QPSK | QPSK | 4 | TBS6 |
| '111' | Pi/4 QPSK | QPSK | 2 | TBS7 |

In Table 7, the first 3 states (or the first 3 items) remain unchanged to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3.

Since the reserved states in the RAR uplink grant are used to indicate resource allocation of the Msg3 NPUSCH for early data transmission, the total number of RAR bits of the NB-IoT UE remains unchanged. Considering backward compatibility, remaining reserved bits in the RAR may be used to indicate whether the RAR uplink grant is an existing uplink grant or an uplink grant for early data transmission. Alternatively, a random access-radio network temporary identity (RA-RNTI) may be used to distinguish whether the RAR uplink grant is an existing uplink grant or an uplink grant for early data transmission.

Based on the consensus reached by 3GPP RAN2, a base station can know a coverage enhancement level of UE by receiving a random access Msg1, and can obtain, according to the coverage enhancement level, a maximum possible transmission block size of the UE or the maximum amount of data to be transmitted by the UE using early data transmission, but cannot know the amount of data to be actually transmitted by the UE when using early data transmission. Thus, the base station can only allocate resources to the Msg3 PUSCH of the UE and determine a repeated transmission number according to the maximum possible transmission block size of the UE. If the amount of uplink data to be transmitted by the UE using early data transmission is less than the maximum transmission block size, additional power loss of the UE will be caused. A group of TBSs may be defined for a maximum transmission block size of each coverage enhancement level, and the UE selects, according to the size of data to be transmitted for early data transmission in the Msg3, a TBS value close to the data size to perform the early data transmission. Thus, the power consumption of the UE can be reduced.

1. Determination of TB S Values and Corresponding Resource Unit Numbers Thereof

Manner 1

One or a plurality of MCS index tables similar to Table 7 are designed. For example, 4 MCS index tables are designed. The first 3 states (or the first 3 items) of a first MCS index table remain unchanged, namely, remain consistent with the first 3 items in the existing MCS index table for an Msg3 NPUSCH, so as to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3. All items in the other three MCS index tables are redesigned, as shown in Table 8.

TABLE 8

Modulation and Coding Scheme Index for Msg3 NPUSCH

| MCS Index $I_{MCS}$ | Modulation $\Delta f = 3.75$ kHz or $\Delta f = 15$ kHz and $I_{SC} = 0, 1, \ldots, 11$ | Modulation $\Delta f = 15$ kHz and $I_{SC} > 11$ | Number of RUs $N_{RU}$ | TBS |
|---|---|---|---|---|
| '000' | Pi/4 QPSK | QPSK | 10 | TBS0 |
| '001' | Pi/4 QPSK | QPSK | 8 | TBS1 |
| '010' | Pi/4 QPSK | QPSK | 6 | TBS2 |
| '011' | Pi/4 QPSK | QPSK | 5 | TBS3 |
| '100' | Pi/4 QPSK | QPSK | 4 | TBS4 |
| '101' | Pi/4 QPSK | QPSK | 3 | TBS5 |
| '110' | Pi/4 QPSK | QPSK | 2 | TBS6 |
| '111' | Pi/4 QPSK | QPSK | 1 | TBS7 |

If only one MCS index table exists, the MCS index table is the aforementioned first MCS index table, namely, Table 7. 2 bits in the 5 bits reserved in the RAR may be used to indicate an MCS index table used by an Msg3 NPUSCH that is currently scheduled.

TBS3, TBS4, TBS5, TBS6, and TBS7 in the aforementioned first MCS index table (for example, Table 7) and TBS0, TBS1, TBS2, TBS3, TBS4, TBS5, TBS6, and TBS7 in the other three MCS index tables (for example, Table 8) are maximum TBSs possibly broadcast by the base station or maximum TBSs possibly indicated by the base station through an RAR uplink grant. The aforementioned TBS values may be the same and may also be different or partially different. The base station indicates an MCS index value for the UE through an MCS index character field in the RAR uplink grant, where the number of resource units, a TBS, and a modulation mode used when the UE performs early data transmission in the Msg3 can be obtained from the index value. It can be specified that the TBS is a maximum TBS that can be used when the UE performs early data transmission in the Msg3. The indicated resource unit number corresponds to the number of resource units used by the maximum TBS, and other TBS values that can be used when the UE performs early data transmission in the Msg3 and the numbers of resource units used corresponding to the other TBSs are obtained from the TBS. For example, the MCS index in the RAR uplink grant is '011' in Table 7, which indicates TBS1 of 1000 bits and a resource unit number of 10. Assuming that four TBS values exist for choice when the UE performs early data transmission in the Msg3, the other 3 TBS values can be: (½)*TBS1=500, (¼)*TBS1=250, and (⅛)*TBS1=125. Since the TBS values of 500, 250, and 125 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following TBS values can be obtained: 504 bits, 256 bits, and 120 bits. Further, the resource unit numbers corresponding to the 3 TBS values are ceil(10/2)=5, ceil(10/4)=3 and ceil(10/8)=2. Alternatively, a group of TBS values and a group of resource unit numbers corresponding thereto are defined for each maximum TBS possibly indicated in the RAR uplink grant. For example, assume it is defined that one group of TBSs contains four TBS values, a group of TBS values defined for the maximum TBS of 1000 bits is {1000, 504, 256, 120}, and resource unit numbers corresponding to the group of TBSs are {10, 5, 3, 2}. The TBS values in the TBS group have one-to-one correspondence with the resource unit numbers in the resource unit number group. That is, the TBS 1000 corresponds to the resource unit number 10; the TBS 504 corresponds to the resource unit number 5; the TBS 256 corresponds to the resource unit number 3; the TBS 120 corresponds to the resource unit number 2. The following is predetermined: positions of the 10, 5, 3, and 2 resource units in the aforementioned 10 resource units. For example, in the case that 10 resource units are allocated, the 5, 3, and 2 resource units are the first 5, 3, and 2 resource units in the allocated 10 resource units.

Manner 2

An MCS index table for an Msg3 NPUSCH similar to Table 7 may be designed for each possibly broadcast maximum TBS; or an MCS index table for an Msg3 NPUSCH similar to Table 7 may be designed for each coverage enhancement level. The first 3 states (or the first 3 items) of the MCS index table for the Msg3 NPUSCH remain unchanged, namely, remain consistent with the first 3 items in the existing MCS index table for an Msg3 NPUSCH, so as to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3. In this manner, the UE interprets or reads the content of the MCS index table based on a coverage enhancement level thereof and according to a maximum TBS broadcast by the base station for the coverage enhancement level. Or the UE interprets or reads the content of the MCS index table according to a coverage enhancement level thereof. Alternatively, a plurality of MCS index tables for an Msg3 NPUSCH similar to the content of Table 7 may be designed. The first 3 states (or the first 3 items) of all the MCS index tables for the Msg3 NPUSCH similar to Table 7 remain unchanged, namely, remain consistent with the first 3 items in the existing MCS index table for an Msg3 NPUSCH, so as to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3. The reserved bits in the RAR may be used to indicate an MCS index table that is used. For example, four MCS index tables are designed, and 2-bit information may be used for indication: '00' indicates a first MCS index table, the first 3 items in the table are the same as the content of Table 7 and used to support the base station in instructing the UE that has applied for early data transmission in the Msg3 to return to existing Msg3 transmission; '01' indicates a second MCS index table; '10' indicates a third MCS index table; '11' indicates a fourth MCS index table. The UE interprets the content of the MCS index table based on the reserved bits in the RAR. Each MCS index table has 5 states that can be used for five different combinations of TBSs, modulation modes, and resource unit numbers that can be used by an Msg3 NPUSCH when the UE performs early data transmission in the Msg3. Thus, no more than five different combinations of TBSs, modulation modes, and resource unit numbers may be designed for each maximum TBS possibly broadcast by the base station or each coverage enhancement level or each MCS index table in the plurality of MCS index tables designed. The UE can obtain an MCS index table available for Msg3 NPUSCH transmission based on a coverage enhancement level thereof or based on a maximum TBS broadcast corresponding to the coverage enhancement level thereof or based on received RAR reserved bits, and then can obtain a plurality of TBSs and corresponding resource unit numbers thereof from the obtained MCS index table. Alternatively, the reserved bits in the RAR may be used to indicate which MCS indexes in the MCS index table obtained by the UE are available for Msg3 NPUSCH transmission. As described above, at most 5 states in the MCS index table are available for the Msg3 NPUSCH for early data transmission. Therefore, 3 bits may be used to indicate which of the 5 MCS indexes in the obtained MCS index table are available for the Msg3 NPUSCH for early data transmission. Alternatively, the 5 reserved states in the MCS index table in the RAR uplink grant may be used to indicate which MCS indexes in the MCS index table obtained by the UE are available for Msg3 NPUSCH transmission. As described above, at most 5 states in the MCS index table are available for the Msg3 NPUSCH for early data transmission. That is, at most 5 MCS indexes in one MCS index table are available for early data transmission. Thus, 5 reserved states may be used to indicate 1, 2, 3, 4, and 5 possible MCS indexes for early data transmission. For example, '011' in the 5 reserved states indicates that 1 MCS index is available for early data transmission; '100' indicates that 2 MCS indexes are available for early data transmission; '101' indicates that 3 MCS indexes are available for early data transmission; '110' indicates that 4 MCS indexes are available for early data transmission; and '111' indicates that 5 MCS indexes are available for early data transmission.

Specifically, the following may be predetermined: a few of the 5 MCS indexes in the MCS index table that are available for the Msg3 NPUSCH for early data transmission. For example, the reserved bits in the RAR indicate that 2

MCS indexes are available for the Msg3 NPUSCH for early data transmission. It can be specified that '011' and '100' or '011' and '101' in the 5 MCS indexes '011,' '100,' '101,' '110,' and '111' of the MCS index table are available for the Msg3 NPUSCH for early data transmission. The UE can thus obtain that 2 TBS values and 2 resource unit numbers corresponding thereto are available for the Msg3 NPUSCH for early data transmission.

Manner 3

For each coverage enhancement level or for a maximum TBS broadcast based on each coverage enhancement level, the base station configures one TBS and a corresponding resource unit number thereof or a plurality of TBSs and corresponding resource unit numbers thereof. Alternatively, parameters corresponding to a certain MCS index in Table 7, namely, the modulation mode, the resource unit number, and the TBS value are used as a group of parameters called a parameter group. The base station configures one or a plurality of parameter groups for each coverage enhancement level or for a maximum TBS broadcast based on each coverage enhancement level. The UE can obtain one or a plurality of TBSs and corresponding resource unit numbers thereof or can obtain one or a plurality of parameter groups based on a coverage enhancement level thereof or based on a maximum TBS broadcast corresponding to the coverage enhancement level thereof. Thus, one or a plurality of TBS values and one or a plurality of resource unit numbers corresponding thereto are obtained.

2. Determination of Repetition Number

A character field of Msg3 repetition number exists in an RAR uplink grant. Like the definition of an RAR uplink grant of Rel-13 NB-IoT, the character field has 3 bits for indicating a repeated transmission number of an Msg3 PUSCH. Illustration is provided below with 4 TBS candidate values as an example.

For early data transmission in an Msg3, the character field indicates the repeated transmission number of the Msg3 NPUSCH when a maximum TBS is used for a certain coverage enhancement level. For the other three TBS values of the same coverage enhancement level, the repeated transmission number of the Msg3 NPUSCH that is the same as that for the maximum TBS will be used. That is, the repetition number indicated in the character field applies to all TBS values of the same coverage enhancement level. Further, the same repetition number applies to all TBS values of the same coverage enhancement level.

3. Behaviors of UE and Base Station

The UE can know its own coverage enhancement level according to downlink reference signal received power (RSRP). When the UE wants to perform the early data transmission in an Msg3, the UE will select a PRACH resource corresponding to the coverage enhancement level thereof to transmit an Msg1.

The base station broadcasts a maximum possible TBS of each coverage enhancement level through system broadcast information, or broadcasts a maximum data transmission amount when the UE is allowed to perform the early data transmission in the Msg3. Or the base station notifies the UE, through RAR uplink grant information, of a maximum TBS available when the UE performs early data transmission in the Msg3.

The UE may obtain, by receiving the system broadcast information or the RAR uplink grant information, a maximum TB S corresponding to a coverage enhancement level thereof when the UE wants to perform the early data transmission in the Msg3. Or the UE may obtain, by receiving the system broadcast information or the RAR uplink grant information, a maximum data transmission amount corresponding to the coverage enhancement level thereof when the base station allows the UE to perform the early data transmission in the Msg3.

When the UE wants to perform the early data transmission in the Msg3, the UE may, according to the maximum TBS obtained by the UE and corresponding to the coverage enhancement level of the UE, obtain four TBS values and corresponding resources thereof using the method "Determination of TBS Values and Corresponding Resource Unit Numbers thereof" in section 1 of this embodiment; and obtain a repeated transmission number of an Msg3 NPUSCH corresponding to the four TBS values using the method "Determination of Repetition Number" in section 2 of this embodiment. Thus, when the UE wants to perform the early data transmission in the Msg3, the UE selects a suitable TBS value according to the size of data the UE wants to transmit and performs transmission of the Msg3 NPUSCH using a repeated transmission number corresponding to the TBS on a resource corresponding to the TBS.

The base station knows, by receiving the Msg1, that the UE wants to perform the early data transmission in the Msg3, and knows the coverage enhancement level of the UE. The base station may obtain, according to the maximum TBS broadcast by the base station and corresponding to the coverage enhancement level of the UE or according to the maximum TBS indicated by the base station in the RAR uplink grant information, a maximum TBS when the UE performs early data transmission in the Msg3. Then, four TBS values and corresponding resources thereof are obtained using the method "Determination of TBS Values and Corresponding Resource Unit Numbers thereof" in section 1 of this embodiment; and a repeated transmission number of an Msg3 NPUSCH corresponding to the four TBS values is obtained using the method "Determination of Repetition Number" in section 2 of this embodiment. Therefore, the base station can perform blind detection on the Msg3 PUSCH using the repetition number of the Msg3 NPUSCH corresponding to the four TBS values on the Msg3 NPUSCH resources corresponding to the four TBS values. Thus, data transmitted by the UE using early data transmission in the Msg3 is detected.

If the amount of the data to be transmitted by the UE using early data transmission in the Msg3 is greater than the maximum TBS indicated in the RAR uplink grant information, the UE will give up transmitting the data to be transmitted by the UE using early data transmission in the Msg3, but transmit existing (Legacy) Msg3 information using early data transmission, namely, only perform existing Msg3 transmission. That is, the UE selects a suitable TBS value according to the amount of the existing Msg3 information, and performs transmission of the Msg3 NPUSCH using a repeated transmission number corresponding to the TBS on a resource corresponding to the TBS. The content transmitted by the Msg3 NPUSCH is only the existing Msg3 information.

Embodiment 3

For Rel-15 MTC, Perform Uplink Early Data Transmission on the Same Resource Size Using Different Repetition Numbers for a Plurality of Different Transmission Block Sizes Possibly Used.

In the existing 3GPP standard specifications related to MTC, the smallest resource allocation unit for a PUSCH is one physical resource block (PRB), and two coverage enhancement modes are supported: a coverage enhancement mode A (CE mode A) and a coverage enhancement mode B (CE mode B). The CE mode A is used for UE having good channel conditions, requiring no coverage enhancement or relatively small coverage enhancement, or requiring no repeated transmission or very few repeated transmissions. The CE mode B is used for UE having poor channel conditions, requiring large or very large coverage enhancement, or requiring many or a very high number of repeated transmissions. Scheduling information of an Msg3 is indicated by an uplink grant (UL Grant) of a random access response (RAR). Table 1 is the content of the RAR uplink grant (see non-patent literature 3: 3GPP TS 36.213 V13.7.0 (2017-09), Table 6-2 in the physical layer step).

The "Msg3 PUSCH narrowband index" field in the table indicates the position of a narrowband in the system bandwidth, where one narrowband is six consecutive physical resource blocks in the frequency domain; the "Msg3 PUSCH Resource allocation" field refers to a resource allocated to a PUSCH carrying an Msg3 in the narrowband; the "Number of Repetitions for Msg3 PUSCH" field refers to a repeated transmission number of the PUSCH carrying the Msg3; the "MCS" field refers to a modulation and coding level used for transmitting the Msg3; the "TBS" field refers to a transmission block size used for transmitting the Msg3; the other content will not be illustrated one by one and can be seen in non-patent literature 3.

The design of the RAR uplink grant for uplink early data transmission may adopt the design of an existing RAR uplink grant. That is, the total number of bits and character fields included are not changed and some character fields are reinterpreted. Alternatively, the total number of bits may be kept unchanged and the number of character fields of the uplink grant and the content of each character field may be redesigned. Considering backward compatibility, reserved bits in the RAR may be used to indicate whether the RAR uplink grant is an existing uplink grant or an uplink grant for early data transmission. Alternatively, a random access-radio network temporary identity (RA-RNTI) may be used to distinguish whether the RAR uplink grant is an existing uplink grant or an uplink grant for early data transmission.

Based on the consensus reached by 3GPP RAN2, a base station can know a coverage enhancement level of UE by receiving a random access Msg1, and can obtain, according to the coverage enhancement level, a maximum possible transmission block size of the UE or the maximum amount of data to be transmitted by the UE using early data transmission, but cannot know the amount of data to be actually transmitted by the UE using EDT. Thus, the base station can only allocate resources to the Msg3 PUSCH of the UE and determine a repeated transmission number according to the maximum possible transmission block size of the UE. If the amount of uplink data to be transmitted by the UE using EDT is less than the maximum transmission block size, additional power loss of the UE will be caused. A group of TBSs may be defined for a maximum transmission block size of each coverage enhancement level, and the UE selects, according to the size of data to be transmitted for early data transmission in the Msg3, a TBS value close to the data size to perform the early data transmission. Thus, the power consumption of the UE can be reduced. Detailed illustration is provided below with the CE Mode B and one group containing four TBS values. The determination of a transmission block size, a resource, and a repetition number is mainly considered.

1. Determination of TB S Values

Four TB S values are obtained in the following three manners:

Manner 1:

For UE having a certain coverage enhancement level, a maximum transmission block size for the UE to perform the early data transmission in the Msg3 is equal to a maximum TBS (X) broadcast based on the coverage enhancement level. Other TBS values are $(\frac{1}{2})*X$, $(\frac{1}{4})*X$, and $(\frac{1}{8})*X$. For example, if a maximum TBS broadcast for UE having a coverage enhancement level 1 is 1000 bits, then the other three TBS values are 500 bits, 250 bits, and 125 bits. Since the TBS values of 500, 250, and 125 bits are not values in the following Table 2, Table of transmission block size for Rel-13 PUSCH (see non-patent literature 3: 3GPP TS 36.213 V13.7.0 (2017-09), Table 7.1.7.2.1-1 in the physical layer step), TBS values closest to the aforementioned values in Table 2 are selected to replace the aforementioned values. Thus, the following TBS values can be obtained: 504 bits, 256 bits, and 120 bits.

In this manner, the UE can directly obtain the four TBS values according to the maximum TBS broadcast by the base station for the corresponding coverage enhancement level of the UE. Therefore, when early data transmission is performed in the Msg3, a TBS character field in the RAR uplink grant may not be used.

Manner 2:

A group of TBSs is predefined for each possibly broadcast maximum TBS, each group of TBSs containing four TBS values. The UE can know, according to a maximum TBS broadcast by the base station for a corresponding coverage enhancement level of the UE, a group of TBSs corresponding to the broadcast maximum TBS. Then, one TBS value in the group of TBSs is indicated by a TBS character field in an RAR uplink grant. The obtained TBS value is a maximum TBS (Y) that can be used by the UE to perform the early data transmission in the Msg3. Other TBS values are $(\frac{1}{2})*Y$, $(\frac{1}{4})*Y$, and $(\frac{1}{8})*Y$. For example, a TBS of 1000 bits is a maximum TBS possibly broadcast by the base station, and a group of TBSs predefined for the maximum TBS is {1000, 808, 600, 328}. The TBS character field in the RAR uplink grant has 2 bits, where 00 corresponds to 1000, 01 corresponds to 808, 10 corresponds to 600, and 11 corresponds to 328. Then, when the TBS character field in the RAR uplink grant is 01, it can be recognized that the maximum TBS that can be used by the UE when performing early data transmission in the Msg3 is 808. At this time, the other three TBSs should be 404, 202, and 101 bits. Since the TBS values of 404, 202, and 101 bits are not values in the following Table 2, Table of transmission block size for Rel-13 PUSCH (see non-patent literature 3: 3GPP TS 36.213 V13.7.0 (2017-09), Table 7.1.7.2.1-1 in the physical layer step), TBS values closest to the aforementioned values in Table 2 are selected to replace the aforementioned values. Thus, the following three TBS values can be obtained: 408, 208, and 104 bits.

Manner 3:

Four groups of TBSs are predefined for each possibly broadcast maximum TBS, each group of TBSs containing four TBS values. The UE can know, according to a maximum TBS broadcast by the base station for a corresponding coverage enhancement level of the UE, four groups of TBSs corresponding to the broadcast maximum TBS. Then, one group of TBSs in the four groups of TBSs is indicated by a TBS character field in an RAR uplink grant. Thus, one group of TBSs, namely, four TBS values, when the UE performs early data transmission in the Msg3 can be obtained. For example, a TBS of 1000 bits is a maximum TBS possibly broadcast by the base station. The following four groups of TBSs are predefined for the maximum TBS: {1000, 504, 256, 120}, {808, 408, 208, 104}, {600, 296, 144, 88}, and {328, 176, 88, 56}. The TBS character field in the RAR uplink grant has 2 bits, and the character field may be used to indicate one group in the four groups of TBSs for the UE for performing early data transmission in the Msg3.

2. Determination of Resources

An Msg3 PUSCH resource allocation character field exists in an RAR uplink grant. Like Rel-13 CE mode B, the character field has three bits to indicate physical resource block (PRB) allocation in a narrowband. The specific content is shown in Table 3.

As can be seen from Table 3, the number of PRBs that can be allocated to an Msg3 PUSCH is 1 or 2 PRBs. It can be specified that the resource allocated in the RAR uplink grant corresponds to a maximum TBS for the UE to perform the early data transmission in an Msg3. That is, if the UE chooses to use the maximum TBS to perform the early data transmission, then the UE will transmit the Msg3 on the resource allocated in the RAR uplink grant. Resources for transmission of other three TBSs are the same as the resource allocated in the RAR uplink grant. That is, the same resource will be used for the four TBS values obtained in "How to Obtain Four TBS Values" in section 1 of this embodiment to perform the early data transmission. Moreover, the resource used is the resource allocated in the RAR uplink grant.

3. Determination of Repetition Number

A character field of Number of Repetitions for Msg3 PUSCH exists in an RAR uplink grant. Like the definition in Rel-13 CE mode B, the character field has 3 bits for indicating a repeated transmission number of an Msg3 PUSCH.

For early data transmission in an Msg3, the character field indicates the repeated transmission number ($N_{Rep}$) of the Msg3 PUSCH when a maximum TBS is used for a certain coverage enhancement level. The other three TBS values of the same coverage enhancement level are: TBS2, TBS3, and TBS4, where TBS2>TBS3>TBS4. Corresponding repeated transmission numbers of the Msg3 PUSCH may be obtained in the following manner: the repeated transmission number of the Msg3 PUSCH of TBS2 is ceil(($\frac{1}{2}$)*$N_{Rep}$); the repeated transmission number of the Msg3 PUSCH of TBS3 is ceil(($\frac{1}{4}$)*$N_{Rep}$); and the repeated transmission number of the Msg3 PUSCH of TBS4 is ceil(($\frac{1}{8}$)*$N_{Rep}$).

4. Behaviors of UE and Base Station

The UE can know its own coverage enhancement level according to downlink reference signal received power (RSRP). When the UE wants to perform the early data transmission in an Msg3, the UE will select a PRACH resource corresponding to the coverage enhancement level thereof to transmit an Msg1.

The base station broadcasts a maximum possible TBS of each coverage enhancement level through system broadcast information, or broadcasts a maximum data transmission amount when the UE is allowed to perform the early data transmission in the Msg3. Or the base station notifies the UE, through RAR uplink grant information, of a maximum TBS available when the UE performs early data transmission in the Msg3.

The UE may obtain, by receiving the system broadcast information or the RAR uplink grant information, a maximum TBS corresponding to a coverage enhancement level thereof when the UE wants to perform the early data transmission in the Msg3. Or the UE may obtain, by receiving the system broadcast information or the RAR uplink grant information, a maximum data transmission amount corresponding to the coverage enhancement level thereof when the base station allows the UE to perform the early data transmission in the Msg3.

When the UE wants to perform the early data transmission in the Msg3, the UE may, according to the maximum TBS obtained by the UE and corresponding to the coverage enhancement level of the UE, obtain four TBS values using the method "Determination of TBS Values" in section 1 of this embodiment; obtain uplink transmission resources of an Msg3 PUSCH corresponding to the four TBS values using the method "Determination of Resources" in section 2 of this embodiment; and obtain a repeated transmission number of the Msg3 PUSCH corresponding to the four TBS values using the method "Determination of Repetition Number" in section 3 of this embodiment. Thus, when the UE wants to perform the early data transmission in the Msg3, the UE selects a suitable TBS value according to the size of data the UE wants to transmit and performs transmission of the Msg3 PUSCH using a repeated transmission number corresponding to the TBS on a resource corresponding thereto.

The base station knows, by receiving the Msg1, that the UE wants to perform the early data transmission in the Msg3, and knows the coverage enhancement level of the UE. The base station may obtain, according to the maximum TBS broadcast by the base station and corresponding to the coverage enhancement level of the UE or according to the maximum TBS indicated by the base station in the RAR uplink grant information, a maximum TBS when the UE performs early data transmission in the Msg3. Then, four TBS values are obtained using the method "Determination of TBS Values" in section 1 of this embodiment; uplink transmission resources of an Msg3 PUSCH corresponding to the four TBS values are obtained using the method "Determination of Resources" in section 2 of this embodiment; and a repeated transmission number of the Msg3 PUSCH corresponding to the four TBS values is obtained using the method "Determination of Repetition Number" in section 3 of this embodiment. Therefore, on the Msg3 PUSCH resources corresponding to the four TBS values, the base station can perform blind detection on the Msg3 PUSCH using the repetition number of the Msg3 PUSCH corresponding to the four TBS values. Thus, data transmitted by the UE using early data transmission in the Msg3 is detected.

If the amount of the data to be transmitted by the UE using early data transmission in the Msg3 is greater than the maximum TBS indicated in the RAR uplink grant information, the UE will give up transmitting the data to be transmitted by the UE using early data transmission in the Msg3, but transmit existing (Legacy) Msg3 information using early data transmission, namely, only perform existing Msg3 transmission. That is, the UE selects a suitable TBS value according to the amount of the existing Msg3 information, and performs transmission of the Msg3 PUSCH using a repeated transmission number corresponding to the TBS on a resource corresponding to the TBS. The content transmitted by the Msg3 PUSCH is only the existing Msg3 information.

Embodiment 4

For RRel-15 NB-1° T, Perform Uplink Early Data Transmission on the Same Resource Size Using Different Repetition Numbers for a Plurality of Different Transmission Block Sizes Possibly Used.

In the existing 3GPP standard specifications related to NB-IoT, an RAR UL Grant used for scheduling an Msg3 NPUSCH has 15 bits, the specific content of which is as follows:

uplink subcarrier interval Δf: '0'=3.75 kHz or '1'=15 kHz—1 bit
allocated subcarrier indicator—6 bits
scheduling delay—2 bits
Msg3 repetition number—3 bits
modulation and coding scheme index (indicating a TBS, a modulation mode, and a resource unit number (Resource Unit: RU))—3 bits The definition of the modulation and coding scheme index in the RAR uplink grant is shown in Table 4.

The specific content of the RAR UL Grant of NB-IoT can be seen in non-patent literature 3: 3GPP TS 36.213 V13.7.0 (2017-09), section 16.3.3: narrowband random access response grant in the physical layer step.

It can be seen from the aforementioned RAR uplink grant that no separate resource unit allocation information exists; instead, 3 bits are used to indicate, in a unified manner, a TBS, a modulation mode, and a resource unit number. This is different from normal NPUSCH scheduling, where the normal NUPUSCH scheduling refers to carrying scheduling information of an NPUSCH by an NPDCCH, namely, scheduling the NPUSCH by the NPDCCH rather than scheduling the NPUSCH by an RAR uplink grant. The normal NPUSCH scheduling uses a downlink control information (DCI) format N0 (DCI Format N0). The specific content is as follows:

distinguishing tag of format N0/N1—1 bit
allocated subcarrier indicator—6 bits
resource allocation—3 bits
scheduling delay—2 bits
modulation and coding scheme—4 bits
redundancy version—1 bit
repetition number—3 bits
new data indicator—1 bit
DCI subframe repetition number—2 bits The specific description of the DCI format N0 can be seen in non-patent literature 4: 3GPP TS 36.212 V13.6.0 (2017-06), section 6.4.3.1 in multiplexing and channel coding.

The specific structure of a MAC RAR of NB-IoT is shown in FIG. 3 (see non-patent literature 5: 3GPP TS 36.321 V13.7.0 (2017-09), section 6.1.5: MAC protocol data unit (PDU) of RAR, in media access control protocol specifications).

It can be seen from FIG. 3 that although the RAR uplink grant is 15 bits, the RAR has 5 bits reserved. However, a resource allocation character field in the normal NPUSCH scheduling needs only 3 bits. Therefore, the existing reserved states in the modulation and coding scheme index for an Msg3 NPUSCH and/or reserved bits in the RAR are used to design an RAR uplink grant for early data transmission or a MAC RAR for early data transmission.

In the design of the RAR uplink grant for early data transmission, the uplink subcarrier spacing, allocated subcarrier indicator, and scheduling delay character fields in the existing RAR uplink grant may be kept unchanged. The determination of a TBS, a resource unit number, and a repetition number of the Msg3 NPUSCH when early data transmission is performed in an Msg3 is mainly considered. Several possible methods for determining the TBS, the resource unit number, and the repetition number are discussed in detail below.

Method 1: use three character fields in an RAR uplink grant to separately indicate the TBS, the resource unit number, and the repetition number.

The RAR uplink grant for performing early data transmission by NB-IoT UE in the Msg3 may be redesigned. That is, a 3-bit resource allocation character field is added, the definition of which is the same as that of the resource allocation character field in the DCI format N0 in the normal NPSUCH scheduling. Moreover, the MCS index character field in the currently existing RAR uplink grant is stored, but the size thereof may be different from the size of the MCS index character field in the existing RAR uplink grant. For example, the size is 2 bits rather than 3 bits. Other character fields in the existing RAR uplink grant may be kept unchanged. In this way, a method similar to that for design for MTC in Embodiment 1 can be applied to NB-IoT.

Since reserved bits in the RAR are used to indicate resource allocation of the Msg3 NPUSCH for early data transmission, the total number of RAR bits of the NB-IoT UE remains unchanged. Considering backward compatibility, remaining reserved bits in the RAR may be used to indicate whether the RAR uplink grant is an existing uplink grant or an uplink grant for early data transmission. Alternatively, a random access-radio network temporary identity (RA-RNTI) may be used to distinguish whether the RAR uplink grant is an existing uplink grant or an uplink grant for early data transmission.

Based on the consensus reached by 3GPP RAN2, a base station can know a coverage enhancement level of UE by receiving a random access Msg1, and can obtain, according to the coverage enhancement level, a maximum possible transmission block size of the UE or the maximum amount of data to be transmitted by the UE using early data transmission, but cannot know the amount of data to be actually transmitted by the UE when using early data transmission. Thus, the base station can only allocate resources to the Msg3 PUSCH of the UE and determine a repeated transmission number according to the maximum possible transmission block size of the UE. If the amount of uplink data to be transmitted by the UE using early data transmission is less than the maximum transmission block size, additional power loss of the UE will be caused. A group of TBSs may be defined for a maximum transmission block size of each coverage enhancement level, and the UE selects, according to the size of data to be transmitted by early data transmission in the Msg3, a TBS value close to the data size to perform the early data transmission. Thus, the power consumption of the UE can be reduced. Detailed illustration is provided below with one group containing four TBS values.

1. Determination of TB S Values

Four TB S values are obtained in the following three manners:

Manner 1:

For UE having a certain coverage enhancement level, a maximum transmission block size for the UE to perform the early data transmission in the Msg3 is equal to a maximum TBS (X) broadcast based on the coverage enhancement level. Other TBS values are $(1/2)*X$, $(1/4)*X$, and $(1/8)*X$. For example, a maximum TBS broadcast for UE having a coverage enhancement level 1 is 1000 bits; then the other three TBS values are 500 bits, 250 bits, and 125 bits. Since the TBS values of 500, 250, and 125 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following TBS values can be obtained: 504 bits, 256 bits, and 120 bits.

In this manner, the UE can directly obtain the four TBS values according to the maximum TBS broadcast by the base station for the corresponding coverage enhancement level of the UE. Therefore, when early data transmission is performed in the Msg3, a TBS character field in the RAR uplink grant may not be used.

Manner 2:

A group of TBSs is predefined for each possibly broadcast maximum TBS, each group of TBSs containing four TBS values. The UE can know, according to a maximum TBS broadcast by the base station for a corresponding coverage enhancement level of the UE, a group of TBSs corresponding to the broadcast maximum TBS. Then, one TBS value in the group of TBSs is indicated by a TBS character field in an RAR uplink grant. The obtained TBS value is a maximum TBS (Y) that can be used by the UE to perform the early data transmission in the Msg3. Other TBS values are (½)*Y, (¼)*Y, and (⅛)*Y. For example, a TBS of 1000 bits is a maximum TBS possibly broadcast by the base station, and a group of TBSs predefined for the maximum TBS is {1000, 808, 600, 328}. The TBS character field in the RAR uplink grant has 2 bits, where 00 corresponds to 1000, 01 corresponds to 808, 10 corresponds to 600, and 11 corresponds to 328. Then, when the TBS character field in the RAR uplink grant is 01, it can be recognized that the maximum TBS that can be used by the UE when performing early data transmission in the Msg3 is 808. At this time, the other three TBSs should be 404, 202, and 101 bits. Since the TBS values of 404, 202, and 101 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following three TBS values can be obtained: 408, 208, and 104 bits.

Manner 3:

Four groups of TBSs are predefined for each possibly broadcast maximum TBS, each group of TBSs containing four TBS values. The UE can know, according to a maximum TBS broadcast by the base station for a corresponding coverage enhancement level of the UE, four groups of TBSs corresponding to the broadcast maximum TBS. Then, one group of TBSs in the four groups of TBSs is indicated by a TBS character field in an RAR uplink grant. Thus, one group of TBSs, namely, four TBS values, when the UE performs early data transmission in the Msg3 can be obtained. For example, a TBS of 1000 bits is a maximum TBS possibly broadcast by the base station. The following four groups of TBSs are predefined for the maximum TBS: {1000, 504, 256, 120}, {808, 408, 208, 104}, {600, 296, 144, 88}, and {328, 176, 88, 56}. The TBS character field in the RAR uplink grant has 2 bits, and the character field may be used to indicate one group in the four groups of TBSs for the UE for performing early data transmission in the Msg3.

2. Determination of Resources

As described above, a 3-bit resource allocation character field is added in an RAR uplink grant of NB-IoT. The definition of the resource allocation character field is the same as that of the resource allocation character field in the normal NPUSCH scheduling. The definition of the 3-bit resource character field is shown in Table 6 (see non-patent literature 3: 3GPP TS 36.213 V13.7.0 (2017-09), Table 16.5.1.1-2 in the physical layer step).

It can be known from Table 6 that the numbers of resource units that can be allocated to the NPUSCH are 1, 2, 3, 4, 5, 6, 8, and 10. It can be specified that the number of resource units allocated in the RAR uplink grant corresponds to a maximum TBS for the UE to perform the early data transmission in an Msg3. That is, if the UE chooses to use the maximum TBS to perform the early data transmission, the UE will transmit the Msg3 using the number of resource units allocated in the RAR uplink grant. The numbers of resource units used for transmission of other three TBSs are the same as the number of resource units allocated in the RAR uplink grant. That is, the same resource unit number will be used for the four TBS values obtained in "How to Obtain Four TBS Values" in section 1 of this embodiment to perform the early data transmission. Moreover, the number of resource units used is the number of resource units allocated in the RAR uplink grant.

3. Determination of Repetition Number

A character field of Msg3 repetition number exists in an RAR uplink grant. Like the definition in Rel-13 NB-IoT, the character field has 3 bits for indicating a repeated transmission number of an Msg3 PUSCH.

For early data transmission in an Msg3, the character field indicates the repeated transmission number ($N_{Rep}$) of the Msg3 PUSCH when a maximum TBS is used for a certain coverage enhancement level. The other three TBS values of the same coverage enhancement level are: TBS2, TBS3, and TBS4, where TBS2>TBS3>TBS4. Corresponding repeated transmission numbers of the Msg3 PUSCH may be obtained in the following manner: the repeated transmission number of the Msg3 PUSCH of TBS2 is $\text{ceil}((½)*N_{Rep})$; the repeated transmission number of the Msg3 PUSCH of TBS3 is $\text{ceil}((¼)*N_{Rep})$; the repeated transmission number of the Msg3 PUSCH of TBS4 is $\text{ceil}((⅛)*N_{Rep})$.

4. Behaviors of UE and Base Station

The UE can know its own coverage enhancement level according to downlink reference signal received power (RSRP). When the UE wants to perform the early data transmission in an Msg3, the UE will select a PRACH resource corresponding to the coverage enhancement level thereof to transmit an Msg1.

The base station broadcasts a maximum possible TBS of each coverage enhancement level through system broadcast information, or broadcasts a maximum data transmission amount when the UE is allowed to perform the early data transmission in the Msg3. Or the base station notifies the UE, through RAR uplink grant information, of a maximum TBS available when the UE performs early data transmission in the Msg3.

The UE may obtain, by receiving the system broadcast information or the RAR uplink grant information, a maximum TBS corresponding to a coverage enhancement level thereof when the UE wants to perform the early data transmission in the Msg3. Or the UE may obtain, by receiving the system broadcast information or the RAR uplink grant information, a maximum data transmission amount corresponding to the coverage enhancement level thereof when the base station allows the UE to perform the early data transmission in the Msg3.

When the UE wants to perform the early data transmission in the Msg3, the UE may, according to the maximum TBS obtained by the UE and corresponding to the coverage enhancement level of the UE, obtain four TBS values using the method "Determination of TBS Values" in section 1 of this embodiment; obtain uplink transmission resources of an Msg3 NPUSCH corresponding to the four TBS values using the method "Determination of Resources" in section 2 of this embodiment; and obtain a repeated transmission number of the Msg3 NPUSCH corresponding to the four TBS values using the method "Determination of Repetition Number" in section 3 of this embodiment. Thus, when the UE wants to perform the early data transmission in the Msg3, the UE selects a suitable TBS value according to the size of data the UE wants to transmit, and performs transmission of the Msg3 NPUSCH using a repeated transmission number corresponding to the TBS on a resource corresponding to the TBS.

The base station knows, by receiving the Msg1, that the UE wants to perform the early data transmission in the Msg3, and knows the coverage enhancement level of the UE. The base station may obtain, according to the maximum TBS broadcast by the base station and corresponding to the coverage enhancement level of the UE or according to the maximum TBS indicated by the base station in the RAR uplink grant information, a maximum TBS when the UE performs early data transmission in the Msg3. Then, four TBS values are obtained using the method "Determination of TBS Values" in section 1 of this embodiment; uplink transmission resources of an Msg3 NPUSCH corresponding to the four TBS values are obtained using the method "Determination of Resources" in section 2 of this embodiment; and a repeated transmission number of the Msg3 NPUSCH corresponding to the four TBS values is obtained using the method "Determination of Repetition Number" in section 3 of this embodiment. Therefore, on the Msg3 NPUSCH resources corresponding to the four TBS values, the base station can perform blind detection on the Msg3 PUSCH using the repetition number of the Msg3 NPUSCH corresponding to the four TBS values. Thus, data transmitted by the UE using early data transmission in the Msg3 is detected.

If the amount of the data to be transmitted by the UE using early data transmission in the Msg3 is greater than the maximum TBS indicated in the RAR uplink grant information, the UE will give up transmitting the data to be transmitted by the UE using early data transmission in the Msg3, but transmit existing (Legacy) Msg3 information using early data transmission, namely, only perform existing Msg3 transmission. That is, the UE selects a suitable TBS value according to the amount of the existing Msg3 information, and performs transmission of the Msg3 NPUSCH using a repeated transmission number corresponding to the TBS on a resource corresponding to the TBS. The content transmitted by the Msg3 NPUSCH is only the existing Msg3 information.

Method 2: use two character fields in an RAR uplink grant to indicate the TBS, the resource unit number, and the repetition number. One character field is used to indicate, in a unified manner, the TBS and the resource unit number, and the other character field is used to separately indicate the repetition number.

In the existing 3GPP standard specifications related to NB-IoT, an RAR UL Grant used for scheduling an Msg3 NPUSCH has 15 bits, the specific content of which is as follows:
  uplink subcarrier interval $\Delta f$: '0'=3.75 kHz or '1'=15 kHz—1 bit
  allocated subcarrier indicator—6 bits
  scheduling delay—2 bits
  Msg3 repetition number—3 bits
  modulation and coding scheme index (indicating a TBS, a modulation mode, and a resource unit number (Resource Unit: RU))—3 bits The definition of the modulation and coding scheme index in the RAR uplink grant is shown in Table 4. The specific content of the RAR UL Grant of NB-IoT can be seen in non-patent literature 3: 3GPP TS 36.213 V13.7.0 (2017-09), section 16.3.3: narrowband random access response grant in the physical layer step.

It can be seen from the aforementioned RAR uplink grant that no separate resource unit allocation information exists; instead, 3 bits are used to indicate, in a unified manner, a TBS, a modulation mode, and a resource unit number. It can be seen from Table 4 that the existing RAR uplink grant uses only 3 states in 8 states of 3 bits to indicate combinations of TBSs, modulation modes, and resource unit numbers of the Msg3 NPUSCH, and 5 states are reserved states. The 5 reserved states may be used to indicate the TBS, the modulation mode, and the resource unit number for the Msg3 NPUSCH performing early data transmission in the Msg3. The other content in the existing RAR uplink grant remains unchanged. For example, the modulation and coding scheme index table shown in Table 7 may be designed.

In Table 7, the first 3 states (or the first 3 items) remain unchanged to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3.

Since the reserved states in the RAR uplink grant are used to indicate resource allocation of the Msg3 NPUSCH for early data transmission, the total number of RAR bits of the NB-IoT UE remains unchanged. Considering backward compatibility, remaining reserved bits in the RAR may be used to indicate whether the RAR uplink grant is an existing uplink grant or an uplink grant for early data transmission. Alternatively, a random access-radio network temporary identity (RA-RNTI) may be used to distinguish whether the RAR uplink grant is an existing uplink grant or an uplink grant for early data transmission.

Based on the consensus reached by 3GPP RAN2, a base station can know a coverage enhancement level of UE by receiving a random access Msg1, and can obtain, according to the coverage enhancement level, a maximum possible transmission block size of the UE or the maximum amount of data to be transmitted by the UE using early data transmission, but cannot know the amount of data to be actually transmitted by the UE when using early data transmission. Thus, the base station can only allocate resources to the Msg3 PUSCH of the UE and determine a repeated transmission number according to the maximum possible transmission block size of the UE. If the amount of uplink data to be transmitted by the UE using early data transmission is less than the maximum transmission block size, additional power loss of the UE will be caused. A group of TBSs may be defined for a maximum transmission block size of each coverage enhancement level, and the UE selects, according to the size of data to be transmitted for early data transmission in the Msg3, a TBS value close to the data size to perform the early data transmission. Thus, the power consumption of the UE can be reduced.

1. Determination of TB S Values and Corresponding Resource Unit Numbers Thereof

Manner 1

One or a plurality of MCS index tables similar to Table 7 are designed. For example, 4 MCS index tables are designed. The first 3 states (or the first 3 items) of a first MCS index table remain unchanged, namely, remain consistent with the first 3 items in the existing MCS index table for an Msg3 NPUSCH, so as to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3. All items in the other three MCS index tables are redesigned, as shown in Table 8.

If only one MCS index table exists, then the MCS index table is the aforementioned first MCS index table, namely, Table 7. 2 bits in the 5 bits reserved in the RAR may be used to indicate an MCS index table used by an Msg3 NPUSCH that is currently scheduled.

TBS3, TBS4, TBS5, TBS6, and TBS7 in the aforementioned first MCS index table (for example, Table 7) and TBS0, TBS1, TBS2, TBS3, TBS4, TBS5, TBS6, and TBS7 in the other three MCS index tables (for example, Table 8) are maximum TBSs possibly broadcast by the base station or maximum TBSs possibly indicated by the base station through an RAR uplink grant. The aforementioned TBS values may be the same or different or partially different. The base station indicates an MCS index value for the UE through an MCS index character field in the RAR uplink grant, where the number of resource units, a TBS, and a modulation mode used when the UE performs early data transmission in the Msg3 can be obtained from the index value. It can be specified that the TBS is a maximum TBS that can be used when the UE performs early data transmission in the Msg3. The indicated resource unit number corresponds to the number of resource units used by the maximum TBS, and other TBS values that can be used when the UE performs early data transmission in the Msg3 are obtained from the TBS. For example, the MCS index in the RAR uplink grant is '011' in Table 7, which indicates TBS1 of 1000 bits and a resource unit number of 10. Assuming that four TBS values exist for choice when the UE performs early data transmission in the Msg3, the other 3 TBS values can be: (½)*TBS1=500, (¼)*TBS1=250, and (⅛)*TBS1=125. Since the TBS values of 500, 250, and 125 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following TBS values can be obtained: 504 bits, 256 bits, and 120 bits. Alternatively, a group of TBS values is defined for each maximum TBS possibly indicated in the RAR uplink grant. For example, assume it is defined that one group of TBSs contains four TBS values, and a group of TBS values defined for the maximum TBS of 1000 bits is {1000, 504, 256, 120}.

The same resource unit number applies to the aforementioned four TBS values. The resource unit number is obtained from the MCS index value indicated for the UE by the MCS index character field in the RAR uplink grant.

Manner 2

An MCS index table for an Msg3 NPUSCH similar to Table 7 may be designed for each possibly broadcast maximum TBS; or an MCS index table for an Msg3 NPUSCH similar to Table 7 may be designed for each coverage enhancement level. The first 3 states (or the first 3 items) of the MCS index table for the Msg3 NPUSCH remain unchanged, namely, remain consistent with the first 3 items in the existing MCS index table for an Msg3 NPUSCH, so as to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3. In this manner, the UE interprets or reads the content of the MCS index table based on a coverage enhancement level thereof and according to a maximum TBS broadcast by the base station for the coverage enhancement level. Or the UE interprets or reads the content of the MCS index table according to a coverage enhancement level thereof. Alternatively, a plurality of MCS index tables for an Msg3 NPUSCH similar to the content of Table 7 may be designed. The first 3 states (or the first 3 items) of all the MCS index tables for the Msg3 NPUSCH similar to Table 7 remain unchanged, namely, remain consistent with the first 3 items in the existing MCS index table for an Msg3 NPUSCH, so as to support the base station in instructing the UE that has applied for early data transmission in the Msg3 to return to existing Msg3 transmission without performing early data transmission. That is, when the MCS Index is '000,' '001,' or '010,' the UE that has applied for early data transmission in the Msg3 will return to existing Msg3 transmission. Further, when the MCS Index is '011,' '100,' '101,' '110,' or '111,' the UE that has applied for early data transmission in the Msg3 will perform the early data transmission in the Msg3. The reserved bits in the RAR may be used to indicate an MCS index table that is used. For example, four MCS index tables are designed, and 2-bit information may be used for indication: '00' indicates a first MCS index table, the first 3 items in the table are the same as the content of Table 7 and used to support the base station in instructing the UE that has applied for early data transmission in the Msg3 to return to existing Msg3 transmission; '01' indicates a second MCS index table; '10' indicates a third MCS index table; '11' indicates a fourth MCS index table. The UE interprets the content of the MCS index table based on the reserved bits in the RAR. Each MCS index table has 5 states that can be used for five different combinations of TBSs, modulation modes, and resource unit numbers that can be used by an Msg3 NPUSCH when the UE performs early data transmission in the Msg3. Thus, no more than five different combinations of TBSs, modulation modes, and resource unit numbers may be designed for each maximum TBS possibly broadcast by the base station or each coverage enhancement level or each MCS index table in the plurality of MCS index tables designed. The UE can obtain an MCS index table available for Msg3 NPUSCH transmission based on a coverage enhancement level thereof or based on a maximum TBS broadcast corresponding to the coverage enhancement level thereof or based on received RAR reserved bits. Then the UE can know which MCS index in the 5 MCS indexes available for early data transmission in the MCS index table is used for current Msg3 NPUSCH transmission, or the UE needs to return to existing Msg3 transmission.

The number of resource units, a TBS, and a modulation mode used when the UE performs early data transmission in the Msg3 can be obtained from the obtained MCS index. It can be specified that the TBS is a maximum TBS that can be used when the UE performs early data transmission in the Msg3. The indicated resource unit number corresponds to the number of resource units used by the maximum TBS, and other TBS values that can be used when the UE performs early data transmission in the Msg3 are obtained from the TBS. For example, the MCS index in the RAR uplink grant is '011' in Table 7, which indicates TBS1 of 1000 bits and a resource unit number of 10. Assuming that four TBS values exist for choice when the UE performs early data transmission in the Msg3, the other 3 TBS values can be: (½)*TBS1=500, (¼)*TBS1=250, and (⅛)*TBS1=125. Since the TBS values of 500, 250, and 125 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following TBS values can be obtained: 504 bits, 256 bits, and 120 bits. Alternatively, a group of TBS values is defined for each maximum TBS possibly indicated in the RAR uplink grant. For example, assuming it is defined that one group of TBSs contains four TBS values, a group of TBS values defined for the maximum TBS of 1000 bits is {1000, 504, 256, 120}.

The same resource unit number applies to the aforementioned four TBS values. The resource unit number is obtained from the MCS index value indicated for the UE by the MCS index character field in the RAR uplink grant.

Manner 3

The base station configures one TBS and a corresponding resource unit number thereof or a plurality of TBSs and corresponding resource unit numbers thereof for each coverage enhancement level or for a maximum TBS broadcast based on each coverage enhancement level. Alternatively, parameters corresponding to a certain MCS index in Table 7, namely, the modulation mode, the resource unit number, and the TBS value, are used as a group of parameters called a parameter group. The base station configures one or a plurality of parameter groups for each coverage enhancement level or for a maximum TBS broadcast based on each coverage enhancement level. The UE can obtain one or a plurality of TBSs and corresponding resource unit numbers thereof or can obtain one or a plurality of parameter groups based on a coverage enhancement level thereof or based on a maximum TBS broadcast corresponding to the coverage enhancement level thereof. Thus, one or a plurality of TBS values and one or a plurality of resource unit numbers corresponding thereto are obtained.

The 5 reserved states in the MCS index table in the RAR uplink grant may be used to indicate the TBS and its corresponding resource unit number, or the specific parameter group in the one or plurality of TBSs and corresponding resource unit numbers thereof, or the one or plurality of parameter groups that are obtained by the UE. For example, 5 TBSs and corresponding resource unit numbers thereof or 5 parameter groups exist. Then, '011' in the 5 reserved states may indicate the existence of a first TBS and a corresponding resource unit number thereof or a first parameter group; '100' may indicate the existence of a second TBS and a corresponding resource unit number thereof or a second parameter group; '101' may indicate the existence of a third TBS and a corresponding resource unit number thereof or a third parameter group; '110' may indicate the existence of a fourth TBS and a corresponding resource unit number thereof or a fourth parameter group; and '111' may indicate the existence of a fifth TB S and a corresponding resource unit number thereof or a fifth parameter group.

The number of resource units and a TBS used when the UE performs early data transmission in the Msg3 can be obtained from the TBSs and corresponding resource unit numbers thereof or the parameter groups that are obtained. It can be specified that the TBS is a maximum TBS that can be used when the UE performs early data transmission in the Msg3. The indicated resource unit number corresponds to the number of resource units used by the maximum TBS, and other TBS values that can be used when the UE performs early data transmission in the Msg3 are obtained from the TBS. For example, the MCS index in the RAR uplink grant is '011' in Table 7, which indicates TBS1 of 1000 bits and a resource unit number of 10. Assuming that four TBS values exist for choice when the UE performs early data transmission in the Msg3, the other 3 TBS values can be: (½)*TBS1=500, (¼)*TBS1=250, and (⅛)*TBS1=125. Since the TBS values of 500, 250, and 125 bits are not values in Table 5, Table of transmission block size for NPUSCH (see non-patent literature 3: 3GPP TS 36.213 V13.7.0 (2017-09), Table 16.5.1.2-2 in the physical layer step), TBS values closest to the aforementioned values in Table 5 are selected to replace the aforementioned values. Thus, the following TBS values can be obtained: 504 bits, 256 bits, and 120 bits. Alternatively, a group of TBS values is defined for each maximum TBS possibly indicated in the RAR uplink grant. For example, assuming it is defined that one group of TBSs contains four TBS values, a group of TBS values defined for the maximum TBS of 1000 bits is {1000, 504, 256, 120}.

The same resource unit number applies to the aforementioned four TBS values. The resource unit number is obtained from the TBSs and corresponding resource unit numbers thereof or parameter groups indicated for the UE by the MCS index character field in the RAR uplink grant.

2. Determination of Repetition Number

A character field of Msg3 repetition number exists in an RAR uplink grant. Like the definition in Rel-13 NB-IoT, the character field has 3 bits for indicating a repeated transmission number of an Msg3 PUSCH. Illustration is provided below with 4 TBS candidate values as an example.

For early data transmission in an Msg3, the character field indicates the repeated transmission number ($N_{Rep}$) of the Msg3 PUSCH when a maximum TBS is used for a certain coverage enhancement level. The other three TBS values of the same coverage enhancement level are: TBS2, TBS3, and TBS4. TBS2>TBS3>TBS4. Corresponding repeated transmission numbers of the Msg3 PUSCH may be obtained in the following manner: the repeated transmission number of the Msg3 PUSCH of TBS2 is $\text{ceil}((\frac{1}{2})*N_{Rep})$; the repeated transmission number of the Msg3 PUSCH of TBS3 is $\text{ceil}((\frac{1}{4})*N_{Rep})$; the repeated transmission number of the Msg3 PUSCH of TBS4 is $\text{ceil}((\frac{1}{8})*N_{Rep})$.

3. Behaviors of UE and Base Station

The UE can know its own coverage enhancement level according to downlink reference signal received power (RSRP). When the UE wants to perform the early data transmission in an Msg3, the UE will select a PRACH resource corresponding to the coverage enhancement level thereof to transmit an Msg1.

The base station broadcasts a maximum possible TBS of each coverage enhancement level through system broadcast information, or broadcasts a maximum data transmission amount when the UE is allowed to perform the early data transmission in the Msg3. Or the base station notifies the UE, through RAR uplink grant information, of a maximum TBS available when the UE performs early data transmission in the Msg3.

The UE may obtain, by receiving the system broadcast information or the RAR uplink grant information, a maximum TB S corresponding to a coverage enhancement level thereof when the UE wants to perform the early data transmission in the Msg3. Or the UE may obtain, by receiving the system broadcast information or the RAR uplink grant information, a maximum data transmission amount corresponding to the coverage enhancement level thereof when the base station allows the UE to perform the early data transmission in the Msg3.

When the UE wants to perform the early data transmission in the Msg3, the UE may, according to the maximum TBS obtained by the UE and corresponding to the coverage enhancement level of the UE, obtain four TBS values and corresponding resources thereof using the method "Determination of TBS Values and Corresponding Resource Unit Numbers Thereof" in section 1 of this embodiment; and obtain a repeated transmission number of an Msg3 NPUSCH corresponding to the four TBS values using the method "Determination of Repetition Number" in section 2 of this embodiment. Thus, when the UE wants to perform the early data transmission in the Msg3, the UE selects a suitable TBS value according to the size of data the UE wants to transmit and performs transmission of the Msg3 NPUSCH using a repeated transmission number corresponding to the TBS on a resource corresponding to the TBS.

The base station knows, by receiving the Msg1, that the UE wants to perform the early data transmission in the Msg3, and knows the coverage enhancement level of the UE. The base station may obtain, according to the maximum TBS broadcast by the base station and corresponding to the coverage enhancement level of the UE or according to the maximum TBS indicated by the base station in the RAR uplink grant information, a maximum TBS when the UE performs early data transmission in the Msg3. Then, four TBS values and corresponding resources thereof are obtained using the method "Determination of TBS Values and Corresponding Resource Unit Numbers Thereof" in section 1 of this embodiment; and a repeated transmission number of an Msg3 NPUSCH corresponding to the four TBS values is obtained using the method "Determination of Repetition Number" in section 2 of this embodiment. Therefore, on the Msg3 NPUSCH resources corresponding to the four TBS values, the base station can perform blind detection on the Msg3 PUSCH using the repetition number of the Msg3 NPUSCH corresponding to the four TBS values. Thus, data transmitted by the UE using early data transmission in the Msg3 is detected.

If the amount of the data to be transmitted by the UE using early data transmission in the Msg3 is greater than the maximum TBS indicated in the RAR uplink grant information, the UE will give up transmitting the data to be transmitted by the UE using early data transmission in the Msg3, but transmit existing (Legacy) Msg3 information using early data transmission, namely, only perform existing Msg3 transmission. That is, the UE selects a suitable TBS value according to the amount of the existing Msg3 information, and performs transmission of the Msg3 NPUSCH using a repeated transmission number corresponding to the TBS on a resource corresponding to the TBS. The content transmitted by the Msg3 NPUSCH is only the existing Msg3 information.

The following numbered examples are embodiments.

1. A method for performing early data transmission, the method comprising:

receiving a random access response message and a broadcast message, the random access response message comprising an uplink grant for user equipment to perform the early data transmission, wherein the uplink grant comprises information indicating resource allocation and information indicating a repetition number;

determining, according to the uplink grant and/or the broadcast message, a maximum transmission block size allowed during the early data transmission and a resource and a repetition number corresponding thereto; obtaining, according to the allowed maximum transmission block size, candidate values of available transmission block sizes and a resource and a repetition number corresponding to each candidate value; and selecting, according to the size of uplink data to be transmitted, a candidate value of a suitable transmission block size and a resource and a repetition number corresponding thereto to perform the early data transmission in a random access message 3.

2. The method according to Example 1, wherein the determining the allowed maximum transmission block size comprises:

using a maximum transmission block size broadcast by a base station and corresponding to a coverage enhancement level of the user equipment to serve as the maximum transmission block size allowed when early data transmission is performed.

3. The method according to Example 1, wherein the uplink grant further comprises index information indicating the allowed maximum transmission block size, and the determining the allowed maximum transmission block size comprises:

determining, according to the index information, the maximum transmission block size allowed when early data transmission is performed from a group of transmission block sizes pre-associated with a maximum transmission block size broadcast by a base station and corresponding to a coverage enhancement level of the user equipment.

4. The method according to Example 1, wherein each allowed maximum transmission block size and candidate values of a group of available transmission block sizes associated therewith have a predetermined mapping relationship; or each allowed maximum transmission block size is pre-associated with the candidate values of a group of available transmission block sizes.

5. The method according to Example 1, wherein the information indicating resource allocation comprised in the uplink grant comprises: information indicating resource allocation corresponding to a time when the allowed maximum transmission block size is used on a coverage enhancement level of the user equipment.

6. The method according to Example 1, wherein the information indicating a repetition number comprised in the uplink grant comprises:

information indicating a unified repetition number corresponding to a coverage enhancement level of the user equipment; or information indicating a repetition number corresponding to a time when the allowed maximum transmission block size is used on a coverage enhancement level of the user equipment.

7. User equipment, comprising:

a receiving unit, configured to receive a random access response message and a broadcast message, the random access response message comprising an uplink grant for user equipment to perform the early data transmission, wherein the uplink grant comprises information indicating resource allocation and information indicating a repetition number;

a processing unit, configured to determine, according to the uplink grant and/or the broadcast message, a transmission block size used by a maximum transmission block size allowed during the early data transmission and resource allocation and a repetition number corresponding thereto; and obtain, according to the allowed maximum transmission block size, candidate values of available transmission block sizes and a resource and a repetition number corresponding to each candidate value; and a transmitting unit, configured to select, according to the size of uplink data to be transmitted, a candidate value of a suitable transmission block size and a resource and a repetition number corresponding thereto to perform the early data transmission in a random access message 3.

8. The user equipment according to Example 7, wherein the processing unit is further configured to:

use a maximum transmission block size broadcast by a base station and corresponding to a coverage enhancement level of the user equipment to serve as the maximum transmission block size allowed when early data transmission is performed.

9. The user equipment according to Example 7, wherein the uplink grant further comprises index information indicating the allowed maximum transmission block size, and the processing unit is further configured to:

determining, according to the index information, the maximum transmission block size allowed when early data transmission is performed from a group of transmission block sizes pre-associated with a maximum transmission block size broadcast by a base station and corresponding to a coverage enhancement level of the user equipment.

10. The user equipment according to Example 7, wherein each allowed maximum transmission block size and candidate values of a group of available transmission block sizes associated therewith have a predetermined mapping relationship; or each allowed maximum transmission block size is pre-associated with the candidate values of a group of available transmission block sizes.

11. The user equipment according to Example 7, wherein the information indicating resource allocation comprised in the uplink grant comprises: information indicating resource allocation corresponding to a time when the allowed maximum transmission block size is used on a coverage enhancement level of the user equipment.

12. The user equipment according to Example 7, wherein the information indicating a repetition number comprised in the uplink grant comprises:

information indicating a unified repetition number corresponding to a coverage enhancement level of the user equipment; or information indicating a repetition number corresponding to a time when the allowed maximum transmission block size is used on a coverage enhancement level of the user equipment.

13. A method for performing early data transmission, the method comprising:

transmitting a random access response message and a broadcast message, the random access response message comprising an uplink grant for user equipment to perform the early data transmission, wherein the uplink grant comprises information indicating resource allocation and information indicating a repetition number;

determining, according to the uplink grant and/or the broadcast message, a maximum transmission block size allowed during the early data transmission and a resource and a repetition number corresponding thereto; obtaining, according to the allowed maximum transmission block size, candidate values of available transmission block sizes and a resource and a repetition number corresponding to each candidate value; and performing blind demodulation detection, based on the candidate values of the available transmission block sizes and the resource and the repetition number corresponding to each candidate value, on the early data transmission performed by the user equipment in a random access message 3.

14. The method according to Example 13, wherein the determining the allowed maximum transmission block size comprises:

using a maximum transmission block size corresponding to a coverage enhancement level of the user equipment to serve as the allowed maximum transmission block size.

15. The method according to Example 13, wherein the uplink grant further comprises index information indicating the allowed maximum transmission block size.

16. The method according to Example 13, wherein each allowed maximum transmission block size and candidate values of a group of available transmission block sizes associated therewith have a predetermined mapping relationship; or each allowed maximum transmission block size is pre-associated with the candidate values of a group of available transmission block sizes.

17. The method according to Example 13, wherein the information indicating resource allocation comprised in the uplink grant comprises: information indicating resource allocation corresponding to a time when the allowed maximum transmission block size is used on a coverage enhancement level of the user equipment.

18. The method according to Example 13, wherein the information indicating a repetition number comprised in the uplink grant comprises:

information indicating a unified repetition number corresponding to a coverage enhancement level of the user equipment; or information indicating a repetition number corresponding to a time when the allowed maximum transmission block size is used on a coverage enhancement level of the user equipment.

19. A base station, comprising:

a transmitting unit, configured to transmit a random access response message and a broadcast message, the random access response message comprising an uplink grant for user equipment to perform the early data transmission, wherein the uplink grant comprises information indicating resource allocation and information indicating a repetition number;

a processing unit, configured to determine, according to the uplink grant and/or the broadcast message, a transmission block size used by a maximum transmission block size allowed during the early data transmission and resource allocation and a repetition number corresponding thereto; and obtain, according to the allowed maximum transmission block size, candidate values of available transmission block sizes and a resource and a repetition number corresponding to each candidate value; and a receiving unit, configured to perform blind demodulation detection, based on the candidate values of the available transmission block sizes and the resource and the repetition number corresponding to each candidate value, on the early data transmission performed by the user equipment in a random access message 3.

20. The base station according to Example 19, wherein the determining the allowed maximum transmission block size comprises:

using a maximum transmission block size corresponding to a coverage enhancement level of the user equipment to serve as the allowed maximum transmission block size.

21. The base station according to Example 19, wherein the uplink grant further comprises index information indicating the allowed maximum transmission block size.

22. The base station according to Example 19, wherein each allowed maximum transmission block size and candidate values of a group of available transmission block sizes associated therewith have a predetermined mapping relationship; or each allowed maximum transmission block size is pre-associated with the candidate values of a group of available transmission block sizes.

23. The base station according to Example 19, wherein the information indicating resource allocation comprised in the uplink grant comprises: information indicating resource allocation corresponding to a time when the allowed maximum transmission block size is used on a coverage enhancement level of the user equipment.

24. The base station according to Example 19, wherein the information indicating a repetition number comprised in the uplink grant comprises:

information indicating a unified repetition number corresponding to a coverage enhancement level of the user equipment; or information indicating a repetition number corresponding to a time when the allowed maximum transmission block size is used on a coverage enhancement level of the user equipment.

25. User equipment, comprising:

a processor; and a memory, the memory storing machine-readable instructions, wherein when executed by the processor, the instructions cause the processor to perform the method according to any one of Examples 1 to 6.

26. A base station, comprising:

a processor; and a memory, the memory storing machine-readable instructions, wherein when executed by the processor, the instructions cause the processor to perform the method according to any one of Examples 13 to 18.

27. A machine-readable medium, storing machine-readable instructions, wherein when executed by at least one processor, the instructions cause the at least one processor to perform the method according to any one of Examples 1 to 6 or 13 to 18.

The methods and related devices according to the present invention have been described above in conjunction with the preferred embodiments. The present invention provides a method for performing early data transmission in a random access process, which can improve data transmission efficiency, reduce power consumption of UE and/or improve resource utilization.

It should be understood by those skilled in the art that the method shown above is merely exemplary. The method of the present invention is not limited to steps or sequences illustrated above. The base station and user equipment shown above may include more modules. For example, the base station and user equipment may further include modules that have been developed or will be developed in the future to be applied to a base station or UE, and the like. Various identifiers shown above are merely exemplary, not for limitation. The present invention is not limited to specific information elements serving as examples of these identifiers. Those skilled in the art can make various alterations and modifications according to the teachings of the illustrated embodiments.

It should be understood that the above-described embodiments of the present invention may be implemented through software, hardware, or a combination of software and hardware. For example, various components inside the base station and the user equipment in the embodiments above can be implemented by various devices, and these devices include, but are not limited to: an analog circuit device, a digital circuit device, a digital signal processing (DSP) circuit, a programmable processor, an application specific integrated circuit (ASIC), a field programmable gate array (FPGA), a programmable logic device (CPLD), and the like.

In the present application, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

Moreover, the embodiments of the present invention disclosed herein can be implemented on a computer program product. More particularly, the computer program product is a product as follows: a product having a computer-readable medium encoded with computer program logic thereon, where when being executed on a computing device, the computer program logic provides related operations to implement the technical solution of the prevent invention. When being executed on at least one processor of a computing system, the computer program logic enables the processor to execute the operations (methods) described in the embodiments of the present invention. Such an arrangement of the present invention is typically provided as software, code, and/or other data structures that are configured or encoded on a computer-readable medium, such as an optical medium (for example, a CD-ROM), a floppy disk, or a hard disk, or other media such as firmware or microcode on one or a plurality of ROM or RAM or PROM chips, or downloadable software images, shared databases and so on in one or a plurality of modules. Software or firmware or such configuration may be installed on a computing device such that one or a plurality of processors in the computing device perform the technical solutions described in the embodiments of the present invention.

Although the present invention has been shown above in connection with the preferred embodiments of the present invention, it will be understood by those skilled in the art that various modifications, substitutions and alterations may be made to the present invention without departing from the spirit and scope of the present invention. Therefore, the present invention should not be defined by the above embodiments, but should be defined by the appended claims and equivalents thereof.

The invention claimed is:

1. A method for a user equipment (UE) for performing an early data transmission, the method comprising:

transmitting a random access message 1 (Msg1) via a physical random access channel (PRACH);

receiving a random access response message which includes an uplink grant for a random access message 3 (Msg3) physical uplink shared channel (PUSCH), the uplink grant including first information indicating resource allocation for the Msg3 PUSCH and second information indicating a first repetition number corresponding to a maximum transmission block size (TBS);

receiving a broadcast message, the broadcast message including third information indicating the maximum TBS which is pre-associated with a group of candidate TBSs equal to or smaller than the maximum TBS for the UE to perform the early data transmission in the Msg3 PUSCH;

determining a TBS and a second repetition number used for the early data transmission in the Msg3 PUSCH; and transmitting the early data transmission in the Msg3 PUSCH using the TBS and the second repetition number, wherein:

the TBS is determined from the group of candidate TBSs pre-associated with the maximum TBS, and the second repetition number is determined based on the first repetition number and a ratio of the TBS to the maximum TBS.

2. A method for a base station for performing an early data transmission, the method comprising:

receiving a random access message 1 (Msg1) via a physical random access channel (PRACH);

transmitting a random access response message which includes an uplink grant for a random access message 3 (Msg3) physical uplink shared channel (PUSCH), the uplink grant including first information indicating resource allocation for the Msg3 PUSCH and second information indicating a first repetition number corresponding to a maximum transmission block size (TBS);

transmitting a broadcast message, the broadcast message including third information indicating the maximum TBS which is pre-associated with a group of candidate TBSs equal to or smaller than the maximum TBS for a user equipment to perform the early data transmission in the Msg3 PUSCH;

determining a TBS and a second repetition number used for the early data transmission in the Msg3 PUSCH; and receiving the early data transmission in the Msg3 PUSCH using the TBS and the second repetition number, wherein:

the TBS is determined from the group of candidate TBSs pre-associated with the maximum TBS, and the second repetition number is determined based on the first repetition number and a ratio of the TBS to the maximum TBS.

3. A user equipment (UE) for performing an early data transmission, the UE comprising:

one or more non-transitory computer-readable media having computer-executable instructions embodied thereon; and at least one processor coupled to the one or more non-transitory computer-readable media, the at least one processor is configured to execute the computer-executable instructions to:

transmit a random access message 1 (Msg1) via a physical random access channel (PRACH);

receive a random access response message which includes an uplink grant for a random access message 3 (Msg3) physical uplink shared channel (PUSCH), the uplink grant including first information indicating resource allocation for the Msg3 PUSCH and second information indicating a first repetition number corresponding to a maximum transmission block size (TBS);

receive a broadcast message, the broadcast message including third information indicating the maximum TBS which is pre-associated with a group of candidate TBSs equal to or smaller than the maximum TBS for the UE to perform the early data transmission in the Msg3 PUSCH;

determine a TBS and a second repetition number used for the early data transmission in the Msg3 PUSCH; and transmit the early data transmission in the Msg3 PUSCH using the TBS and the second repetition number, wherein:

the TBS is determined from the group of candidate TBSs pre-associated with the maximum TBS, and the second repetition number is determined based on the first repetition number and a ratio of the TBS to the maximum TBS.

4. A base station (BS) for performing an early data transmission, the BS comprising:

one or more non-transitory computer-readable media having computer-executable instructions embodied thereon; and at least one processor coupled to the one or more non-transitory computer-readable media, the at least one processor is configured to execute the computer-executable instructions to:

receive a random access message 1 (Msg1) via a physical random access channel (PRACH);

transmit a random access response message which includes an uplink grant for a random access message 3 (Msg3) physical uplink shared channel (PUSCH), the uplink grant including first information indicating resource allocation for the Msg3 PUSCH and second information indicating a first repetition number corresponding to a maximum transmission block size (TBS);

transmit a broadcast message, the broadcast message including third information indicating the maximum TBS which is pre-associated with a group of candidate TBSs equal to or smaller than the maximum TBS for a user equipment to perform the early data transmission in the Msg3 PUSCH;

determine a TBS and a second repetition number used for the early data transmission in the Msg3 PUSCH; and receive the early data transmission in the Msg3 PUSCH using the TBS and the second repetition number, wherein:

the TBS is determined from the group of candidate TBSs pre-associated with the maximum TBS, and the second repetition number is determined based on the first repetition number and a ratio of the TBS to the maximum TBS.

* * * * *